United States Patent [19]
Hönig et al.

[11] 3,903,857
[45] Sept. 9, 1975

[54] DIGITAL TRIGGER SYSTEM TO CONTROL TIMING OF A CONTROLLED EVENT WITH RESPECT TO OPERATION OF AN APPARATUS, PARTICULARLY DIGITAL IGNITION TIMING CIRCUIT FOR INTERNAL COMBUSTION ENGINES

[75] Inventors: Günter Hönig, Markgroningen; Alfred Schulz, Braunschweig, both of Germany

[73] Assignee: Robert Bosch G.m.b.H., Gerlingen-Schillerhohe, Germany

[22] Filed: Oct. 17, 1974

[21] Appl. No.: 515,696

[30] Foreign Application Priority Data
Oct. 20, 1973 Germany.......................... 2352694

[52] U.S. Cl...................... 123/117 R; 123/146.5 R
[51] Int. Cl.².......................................... F02P 3/02
[58] Field of Search...... 123/117 R, 146.5 R, 32 EA

[56] References Cited
UNITED STATES PATENTS

| | | | |
|---|---|---|---|
| 3,454,871 | 7/1969 | Nolting | 123/117 R |
| 3,738,339 | 6/1973 | Huntzinger et al. | 123/117 R |
| 3,749,073 | 7/1973 | Asplund | 123/117 R |
| 3,752,139 | 8/1973 | Asplund | 123/117 R |
| 3,757,755 | 9/1973 | Carner | 123/117 R |
| 3,831,563 | 8/1974 | Brittain et al. | 123/32 EA |
| 3,853,103 | 12/1974 | Wahl et al. | 123/117 R |
| 3,855,973 | 12/1974 | Scofield | 123/146.5 R |

*Primary Examiner*—Charles J. Myhre
*Assistant Examiner*—Joseph Cangelosi
*Attorney, Agent, or Firm*—Flynn & Frishauf

[57] ABSTRACT

A pulse train source is coupled to a movable element of the apparatus, for example to the crankshaft of an internal combustion engine to provide a speed-dependent pulse train; a reference pulse source provides a reference pulse at a predetermined crankshaft position. Pulse trains having frequencies representative of other engine operating parameters, for example intake manifold vacuum, engine temperature, and the like, may also be provided. A function storage and transform stage stores, in sequential addresses, the transfer function characteristic between change in speed, manifold inlet pressure, engine temperature, and the like, and required spark advance (or retard) for optimum combustion, in sequential addresses, with respect to speed (or inlet vacuum, temperature, etc.) ranges, and provides sequential binary numbers representative of ignition timing, at the respective speed (and inlet vacuum, temperature, etc.), which are totalized and compared in a binary comparator with the speed pulse train and, upon equality, issues a trigger signal to initiate ignition.

33 Claims, 15 Drawing Figures

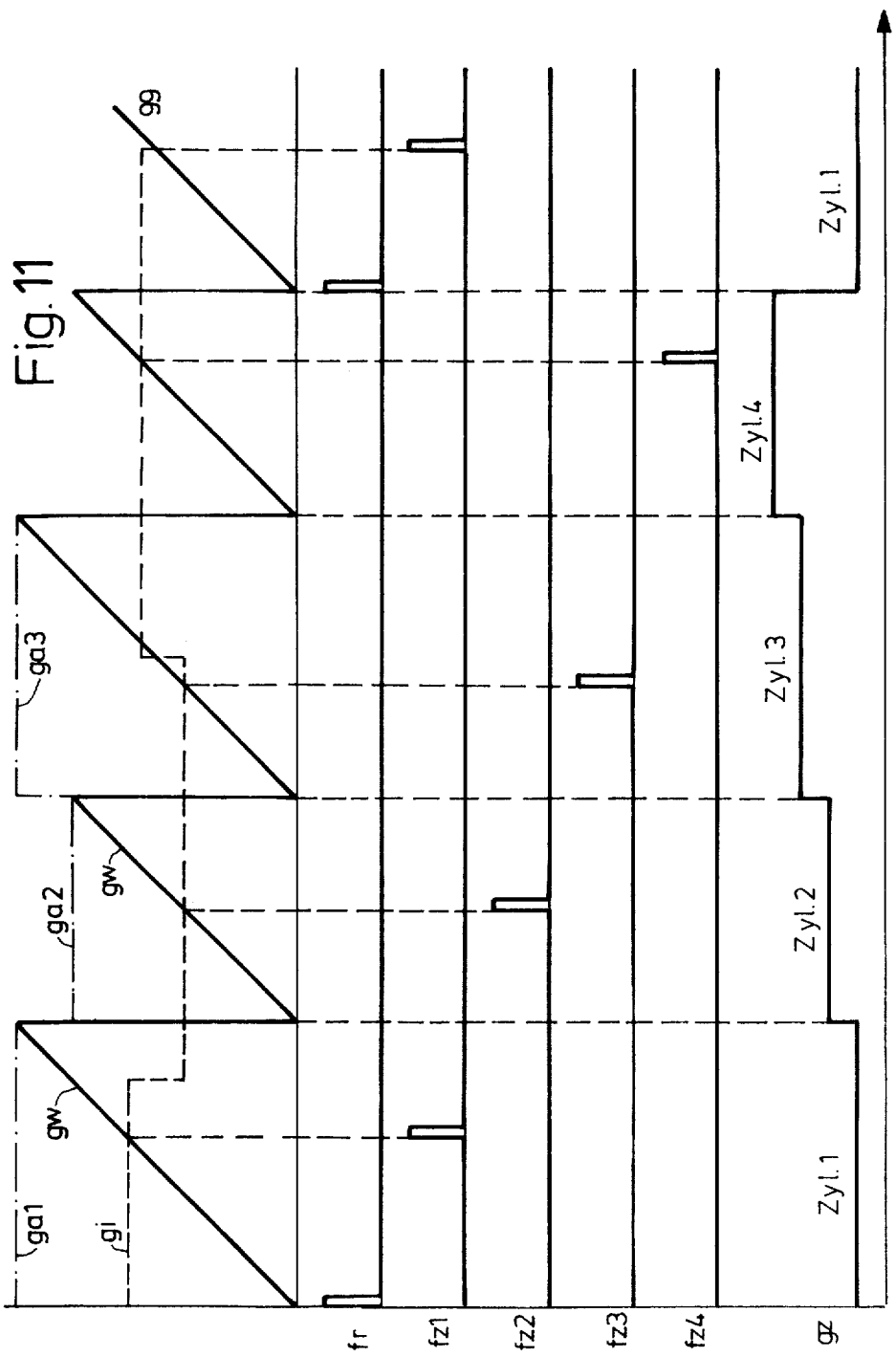

DIGITAL TRIGGER SYSTEM TO CONTROL TIMING OF A CONTROLLED EVENT WITH RESPECT TO OPERATION OF AN APPARATUS, PARTICULARLY DIGITAL IGNITION TIMING CIRCUIT FOR INTERNAL COMBUSTION ENGINES

Cross reference to related applications:
U.S. Ser. No. 496,651, filed Aug. 12, 1974;
U.S. Ser. No. 509,846, filed Sept. 27, 1974 (claiming Germany priority of Nov. 15, 1973: P2357061.8).

The present invention relates to a digital trigger timing system to control the timing of a controlled event with respect to operation of an apparatus which has elements which move upon operation of the apparatus, and more particularly to control the ignition timing of an internal combustion engine with respect to speed and other operating parameters of the engine, such as inlet manifold vacuum, engine temperature, and the like.

The system in accordance with the present invention is primarily adapted to trigger an operating event when a rotating shaft of an engine, typically the crankshaft of an internal combustion engine, has a certain predetermined position with respect to a reference position, and in which the timing of the operating event, with respect to the shaft position, changes as operating parameters of the engine change. The relationship between change in timing of the operating event and change in operating parameters is non-linear. The system is particularly adapted to trigger ignition in an internal combustion engine, and has a primary applicability to change the firing angle of spark plugs; the system, with only minor changes, however, may be equally adapted, when used with internal combustion engines, to determine the injection timing of fuel injection valves, to determine the opening and closing of inlet and outlet valves, and the like. If the system is applied to control the firing angle of the spark plugs, then the most important operating parameters to be considered are the speed of the internal combustion engine and loading on the engine. Inlet manifold vacuum is usually taken as a representative value for loading on the engine.

The present invention will be described in connection with ignition timing. Similar considerations which apply to ignition timing are also applicable to timing of fuel injection, and timing of operation of the valves of the engine.

Analysis of ignition in an internal combustion engine, by means of a spark plug, shows that immediately upon sparking, only that portion of the fuel-air mixture will be ignited which is in the immediate vicinity of the spark plug. A flame pulse, or flame front then propagates in the space between the cylinder and the upper surface of the piston and, in a finite period of time, ignites the entire mixture. If the fuel-air mixture is rich, that is, has a slight excess of fuel over air (with respect to stoichiometric proportion), so that the mixture ignites readily, about 2 msec. are required for the flame front to propagate from the spark plug to the wall of the cylinder (in the most common types of automotive internal combustion engines). If the mixture is lean, so that ignition is not readily accomplished, then the time is somewhat extended.

For optimum operation of the internal combustion engine, maximum combustion pressure should be obtained just after the piston has passed the upper dead center (UDC) position, that is, the position in which the mixture has been compressed to its greatest extent. The flame front, therefore, should reach the wall of the cylinder only when the piston has just passed the UDC position. To simplify the explanation, the definition of "firing angle" will be used, which is defined as that angle of the crankshaft to which the piston is connected, at which the spark plug fires. This angle is measured in degrees with respect to UDC position, and may be in advance or behind UDC position corresponding respectively, to spark advance and spark retard.

The propagation time of the flame front is practically constant. Since the propagation time is practically constant, the ignition angle must be advanced before UDC position as speed increases. It is well known that, with increasing speed, the spark must be advanced. The actual time between firing of the spark plug and the passage of the piston through UDC position remains, effectively, constant. The terms "advance" and "retard" with respect to the spark refer to the angular position of ignition, with respect to crankshaft angle, and not to time intervals.

Spark advance, with increasing speed, has usually been accomplished by means of centrifugal controllers, which change the firing angle towards spark advance, as the engine speed increases. It is also customary to provide a diaphragm chamber connected to the inlet manifold, or just behind the carburetor which is so connected to the ignition system that, when the engine is operating under light loading or under idling, the spark angle is shifted further in the direction of advance. This is necessary since, upon light loading or idling of the engine, the engine will receive a rather lean mixture so that the flame front will take longer periods of time to propagate from the spark plug to the wall of the cylinder.

Electronic ignition systems have previously been proposed. The characteristics of mechanical spark advance control systems can be simulated by use of pulse trains, of various frequencies, or, rather, pulse repetition rates (PRR's), and by signals representing binary numbers. Errors which arise due to wear of mechanical parts are thereby effectively eliminated. A reference pulse source has been proposed which provides a reference pulse once for each revolution of the crankshaft at a predetermined crankshaft position - for example at UDC position - which controls a counter to reset the counter. The count of the counter itself is controlled from a pulse source connected to the crankshaft which provides a large number of pulses which are counted by the counter. The count state is a measure for the angle through which the crankshaft has moved since the last preceding reference pulse.

To determine operating speed, a monostable flip-flop is provided of predetermined timing, and the pulses are counted during the pulse duration of the monostable flip-flop. At high speed, only a few pulses will be counted. After the monostable flip-flop has reverted back to its stable state, that is, after the pulse duration of the monostable flip-flop, the count of the counter is interrupted, and continued only later, and carried to a predetermined final count number, at which time the ignition pulse is triggered.

This system has the capability of considering not only engine speed in determining the ignition time, but also other operating parameters, for example inlet manifold vacuum, or some other parameter which is representative of loading on the engine. Inlet manifold vacuum, or such other parameter, is used to control the pulse duration of the monostable flip-flop, that is, the reference time during which the speed determination is made. This circuit, therefore, is a mixture of analog and digital circuit technology. It has been found that using analog circuitry in such systems has the disadvantage that the system must be adjusted to compensate or to avoid stray influences, for example by stray fields, or other inaccuracies; further, the circuit components used in the analog portion of the circuit, due to aging and environmental conditions (for example extreme variations in temperature, shock, vibration, and the like) may change in their respective values, thus changing the pulse duration of the monostable flip-flop by factors not determined by the operation of the engine itself. Compensating for such changes becomes increasingly difficult as the number of operating parameters to be considered increases. For example, it has been proposed, and it is desirable to also consider adjustment of the ignition timing in dependence on the composition of the exhaust gases from the internal combustion engine, to provide for minimum noxious exhaust. It is particularly important in exhaust detoxification systems to change the ignition towards spark retard when the engine operates under idling conditions.

The system, as previously proposed, permits change of ignition timing with speed only in one direction, that is, upon increasing speed the spark is increasingly advanced. This change is similar to that effected by mechanical spark advance controllers. Accurate measurements have shown, however, that various types of engines require some spark retardation — or at least a lesser degree of spark advance — as the engine speed increases substantially and reaches approximately maximum speed, or within various ranges of engine speed, particularly in the higher speed ranges. The reason to decrease the spark advance, and possibly even delay ignition, is believed to be due to flow conditions and acoustic resonance phenomena which arise in the inlet manifold, in the exhaust manifold, and in the exhaust system of the internal combustion engine. Changes in flow conditions influence the fill of the cylinder, and thus the ability of the mixture to ignite readily. The relative location of a cylinder with respect to the induction pipe connection to the inlet manifold also may have a bearing on the ignition timing of the respective cylinder.

It is an object of the present invention to provide a control system to trigger an event with respect to a movable element in an apparatus, typically to trigger the ignition instant with respect to crankshaft position of the internal combustion engine which operates entirely digitally, which is versatile and permits the simulation, and the operation in accordance with such simulation of various speed-ignition timing functions which may have ranges of spark advance, as well as spark retard, as speed increases.

SUBJECT MATTER OF THE PRESENT INVENTION

Briefly, a function storage and transform stage is provided which stores the transfer characteristic between change in position of an apparatus element, typically speed of the engine, and resulting required change in timing of the trigger signal, typically the ignition instant, with respect to a reference position (for example UDC position). The function storage and transform stage is connected to receive a pulse train which is applied thereto, representative of motion of the apparatus element (typically rotation of the crankshaft) and generates a modified pulse train which has a frequency or pulse repetition rate (PRR) which is determined by the stored transfer characteristic relating the relative changes of position, or speed, and change in timing of the event (ignition); the pulse train is applied to a reversible counter, that is, to a counter which can count both in forward and backward direction (to accommodate both spark advance and spark retard information), the totalized count at the counter being applied to one input of a binary comparator. A change of position counter has a count input terminal connected to a pulse train source, and provides output pulses as the position of the apparatus element (rotation of the crankshaft) changes. The change-of-position counter is reset from the reference pulse source, typically a signal occurring at a predetermined angular position in advance of UDC position.

When applied to an internal combustion engine, ignition timing is triggered when the change-of-position counter has the same count state as the reversible totalizing counter. The upper count limit, or count number thus varies without use of a monostable flip-flop in order to determine speed. The function storage and transform stage preferably includes a digital multiplier. The upper counting limit, that is, the upper count number is determined in dependence on speed, or other operating parameters of the engine. The totalizing counter connected to the storage and transform stage can count in two count directions; thus, in some speed ranges in which spark is not to be advanced anymore but, rather, retarded with respect to a previous advance, the ignition angle can be shifted in the retarding direction even with increasing speed of the engine.

The variable, upper count number which can be reached by the totalizing bi-directional counter thus permits, in a simple manner, the use of pure digital analysis and correlation of the various operating parameters, and to set the ignition instant in dependence on the various parameters. The monostable flip-flop, the timing of which is an analog of operating parameters, is thus not needed anymore, and adjustment work with respect to the timing of the monostable flip-flop is unnecessary. Aging influences, stray fields, and other changes in operation of the system which are not commanded by changes in actual operation of the engine, are eliminated.

The invention will be described by way of example with reference to the accompanying drawings, wherein:

FIG. 3b is a timing diagram to illustrate the operation of the circuit of FIG. 3a;

FIG. 11 is a series of diagrams to illustrate the operation of the circuit of FIG. 10;

Figure 1:
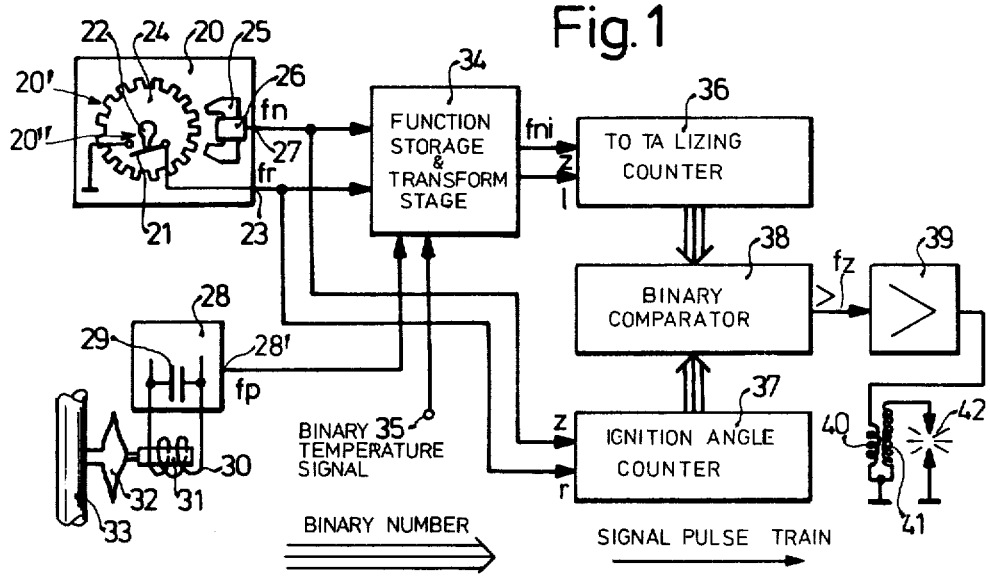
FIG. 1 is a schematic block diagram of the system in accordance with the present invention, applied to control the ignition of an internal combustion engine.

A signal transducer 20 (FIG. 1) provides, in a section 20', a pulse train, or sequence of pulses and, in a section 20'', a reference pulse. The reference pulse may be generated, for example, by a switch 21 controlled by a cam 22. Cam 22 opens the switch 21 once for each revolution of cam 22. One terminal of switch 21 is grounded, the other terminal being connected to an output terminal 23 of the signal transducer 20, at which terminal a signal of frequency fr can be derived.

The transducer section 20' includes a star-wheel 24 having ferromagnetic teeth. The star-wheel or toothed wheel 24 is coupled to the engine to be driven with a speed synchronous with crankshaft speed of the internal combustion engine. The teeth of star-wheel 24 pass by a yoke 25 on which a coil 26 is wound. The magnetic reluctance of the air gap between the yoke 25 and the star-wheel 24 changes periodically. Coil 26 will thus have an alternating voltage, in pulses, induced therein, which have a frequency proportional to the speed of the crankshaft. The output frequency of the pulses from the pulse generator 20' is available at terminal 27 and is designed $fn$; terminal 27 is connected to the coil 26.

The signal generator 20, at its two terminals 23, 27, furnishes output signals which provide information regarding the angular position of the shaft and the speed thereof. Other operating parameters of the engine are also analyzed. One of the important operating parameters is loading, represented for example by vacuum in the inlet manifold, or in the induction pipe to the engine. An oscillator 28 has an L/C tank circuit which includes a capacitor 29 and a coil 30. Coil 30 surrounds a movable core 31 which is mechanically coupled to a vacuum measuring diaphragm chamber 32. The diaphragm chamber 32 is connected to the inlet manifold 33 of the internal combustion engine. The output frequency of oscillator 28 is available at terminal 28' and is designated $fp$; it depends on the vacuum in the inlet manifold.

Terminal 35 has an electrical signal thereon depending on a further operating parameter, for example cooling water temperature. The signal at terminal 35 is a binary signal, that is, it is either a 1 or a 0-signal, depending upon whether the temperature is above or below a given temperature level.

The central element of the circuit of FIG. 1 is a function storage and transform stage 34. Stage 34, in the illustrated example, has four inputs. Two of these inputs are connected to terminals 23, 27 of the signal transducer 20; a third input is connected to the output terminal 28' of the oscillator 28, and the fourth input is connected to terminal 35. The function storage and transform stage 34, thus, receives the frequencies $fn, fr, fp$ and the temperature signal from terminal 35 and generates a pulse train of frequency $fni$ which depends on the speed as well as on the vacuum in the inlet manifold, and additionally includes information representative of temperature of the engine. The frequency train $fni$ thus is a measure for the required ignition angle.

The pulse train $fni$ from stage 34 is counted in a totalizing counter 36. The pulse train $fni$ is applied to the count input $z$ from stage 34, and it starts counting upon a count command applied to terminal 1. An ignition angle counter 37 has its count input $z$ connected to output terminal 27 of the signal generator 20 and its reset terminal $r$ to the reference frequency terminal 23 of the signal generator 20. The binary numbers from the totalizing counter 36 and from the ignition angle counter 37 are connected to a binary comparator 38.

To facilitate analysis of the drawings, lines, cables and the like which transfer pulse frequencies are indicated by single lines in the drawings, whereas cables, or connection lines which transfer binary numbers — of any necessary digits — are indicated by triple lines, as also shown in FIG. 1.

The binary comparator 38, at its "larger than" output (>) provides a signal as soon as the number from the ignition angle counter 37 is greater than the binary number derived from totalizing counter 36. The output of the comparator 38 is connected to the input of a power amplifier 39. The primary 40 of an ignition coil is connected between the output of power amplifier 39 and ground; the secondary 41 of the ignition coil is connected to a spark plug 42, the other terminal of which is grounded as usual. FIG. 1 illustrates the circuit for ignition of a single-cylinder motor. The connection for multi-cylinder motors is discussed below, with reference to FIG. 10.

The ignition angle counter 37 has a reset terminal $r$ which is actuated once for each crankshaft rotation at a predetermined reference position, for example 60° before UDC position, by connection to the pulse source 20'', terminal 23, pulses $fr$. The ignition angle counter 37 then counts the output pulses from the pulse train transducer 20'. The binary number which will appear at the output of the ignition angle counter 37 is then a measure of the angle of the crankshaft with respect to the reference position.

If ignition is to be advanced substantially, then ignition must be initiated at a low counter state of the angle counter 37. The totalizing counter 36 thus must have a correspondingly low binary number at its output, so that the comparator 38 will cause the ignition to occur when the count states of the two counters is the same, or as soon as the count number from ignition angle counter 37 becomes greater than that of the totalizing counter 36. If ignition is to be retarded, that is, the closer the ignition instant comes to the UDC position or, if the ignition instant even goes beyond UDC position, a larger number is required from the output of totalizing counter 36 and, of course, of ignition angle counter 37. The details of the generation of the numbers will be explained in connection with FIGS. 4 to 9.

In a practical embodiment, star-wheel 24 has one hundred teeth; the number is not critical. If the system is applied to internal combustion engines for automotive use, then normal speeds thereof are between 600 and 6,000 rpm, that is, 10 to 100 revolutions per second. The output frequency $fn$ from coil 26, therefore, will be in the range between 1 kHz and 10 kHz.

Figure 2:
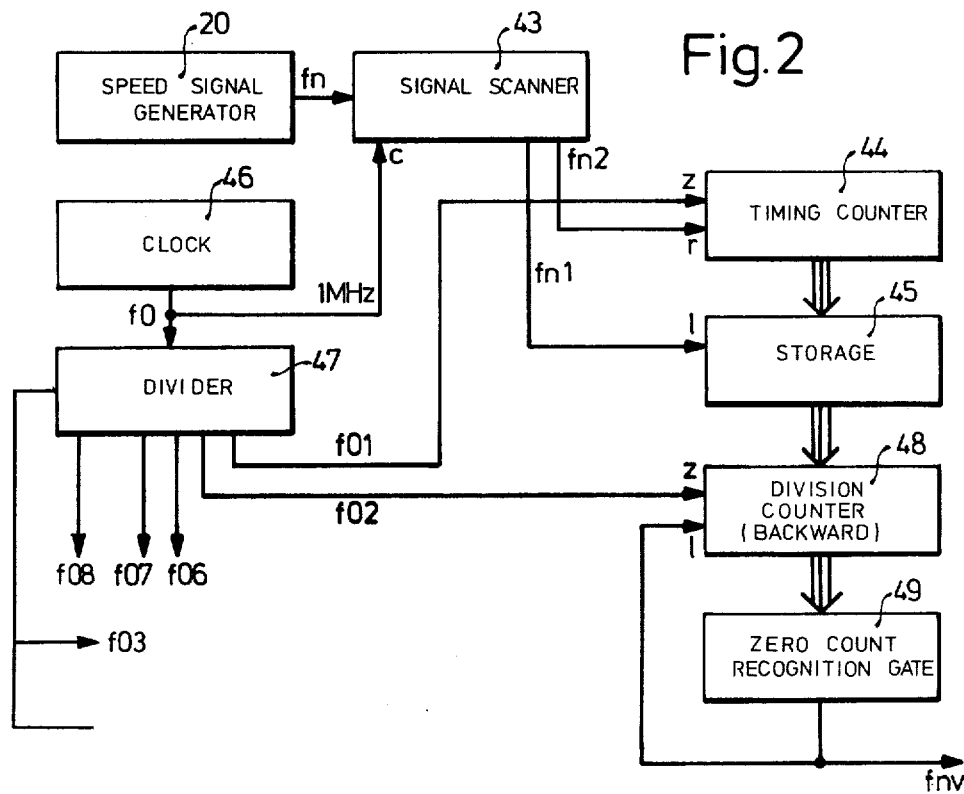
FIG. 2 is a block diagram of a frequency multiplier circuit.

Digital calculating circuits do not operate efficiently when processing frequencies in the order of from 1 kHz to 10 kHz since the calculating speed obtained thereby is insufficient, particularly when "real time" calculations are required. Frequencies of from between 100 kHz and 1 MHz should, therefore, be generated. FIG. 2 illustrates a frequency multiplier circuit which is connected to the output 27 of the signal generator 20'.

The speed signal generator 20' has its output 27, at which the signal $fn$ appears, connected to the input of a signal scanning circuit 43, the details of which will be explained in connection with FIGS. 3a and 3b. The signal scanner 43 has two outputs. Converted and relatively time-shifted output frequencies $fn1$ and $fn2$ are available at the outputs. The frequency $fn2$ is applied to the reset terminal $r$ of a timing counter 44. The binary output of the timing counter 44 is connected to the binary number input of a storage or memory stage 45. The frequency $fn1$ is applied to the loading input 1 of the storage stage 45.

The timing of the entire digital circuit of the system in accordance with the present invention is controlled by a clock 46. Clock 46 provides a base frequency $f0$ to a frequency divider circuit 47. The frequency divider circuit 47 may consist of a divider counter and a divider gate and may include components similar to those of element 67, FIG. 4, to be described below.

The frequency divider circuit 47 provides, at its outputs, divided clock frequencies $f01$, $f02$, as well as substantially divided frequencies $f06$, $f07$. The substantially divided frequencies $f06$, $f07$, being at a much lower frequency level, are used in the function storage and transform stage 34 as timing or marker pulses to trigger predetermined events, or calculating steps arising therein.

The output of clock source 46 is further connected to a clock input $c$ of the signal scanner 43. The divided clock frequency $f01$ is applied to the counting input $z$ of the timing counter 44.

The binary number output of the storage stage 45 is connected to the binary number input of a division counter 48. The counting input of the division counter 48 is controlled by frequency $f02$ derived from the frequency divider 47. The division counter 48 is a backward counter; its binary number output is connected to a zero count recognition gate 49, which recognizes when the counting state, or count number of counter 48 is zero. The output of gate 49 is a pulse train fnv which is a multiplied pulse train of the frequency $fn$. This frequency is also applied to the loading input 1 of the division counter 48.

Clock 46, in one example, is a quartz controlled crystal oscillator having a base frequency $f0$ of 1 MHz. The frequency is not critical, but a frequency of 1 MHz permits use of commercial components in the system without placing extreme requirements regarding wave shapes thereon. The output frequencies $fn1$ and $fn2$ of the signal scanning circuit 43 are of equal frequency and are exactly those of the frequency $fn$ derived from terminal 27 of the pulse generator 20'. The individual pulses of the pulse trains are time-shifted, or phase-shifted with respect to each other, as will appear in connection with the discussion of FIG. 3a and FIG. 3b. The timing counter 44 is reset by each pulse $fn2$ to zero. Thereafter, and during the time of one cycle of the frequency $fn2$, it counts the pulses of the clock frequency $f01$. The final count of the counter is transferred by a pulse $fn1$, at the base frequency $fn$, to the storage stage 45. Thereafter, the timing counter 44 is reset by the next pulse $fn2$ and can continue to count again. The final count number in the timing counter 44 is proportional to the cycling duration of the frequency $fn2$ and thus inversely proportional to the speed of the crankshaft of the engine.

The final count number from timing counter 44, and stored in storage stage 45, is transferred at each output pulse fnv of the gate circuit 49 to the backward division counter 48. Starting with this count number, the division backward counter counts down at the clock frequency $f02$, until the counter reaches zero or null. Zero count recognition gate 49 recognizes the ZERO state of counter 48 and provides a pulse $fnv$ which is connected back to the loading input of the division counter 48, to control the counter to again receive the content of the storage or memory stage 45.

Gate 49, in the example, is a simple AND-gate which provides a signal when all the stages of the division counter 48 have reached ZERO state.

The multiplied frequency fnv increases with increase of the clock frequency $f02$, since the content of the storage stage 45 is counted back to zero at the rate of the frequency $f02$, thus reaches zero faster if the counting frequency is high. Conversely, the frequency $fnv$ is lower as the clock frequency $f01$ is increased since, in a given cycle duration of frequency $fn2$, the final count state of the timing counter 44 will be higher as the counting frequency increases. The speed signal train $fn$ thus is multiplied in the multiplying stage of FIG. 2 by a factor which is equal to the quotient of $f02/f01$. If a higher multiplication factor is desired, the clock frequency $f02$ must be selected to be high with respect to the clock frequency $f01$.

Figure 3A:
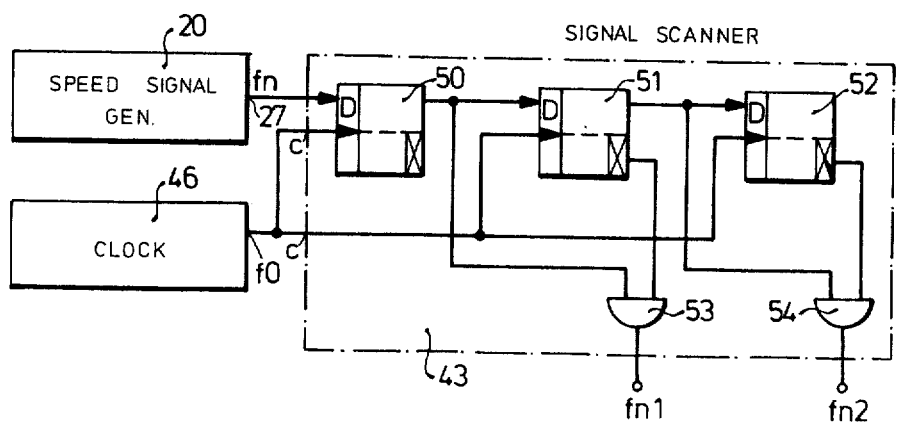
FIG. 3a is a block diagram of a signal scanning circuit.

The signal scanner 43 is illustrated in detail in FIG. 3a. Three flip-flops, which are delay flip-flops, are serially connected to the speed signal generator 20'. These D flip-flops have a control input D, and a clock input $c$, and two complementary outputs; the negative output is indicated by a cross mark. Complementary, in the sense used herein, means that one output has a logic 1-signal when the other output has a logic 0-signal, and vice versa. The first D flip-flop 50 has its D input connected to the output 27 of the speed signal generator 20'. The two subsequent flip-flops (FF) 51, 52 have their respective D input connected to the positive output of the preceding FF 50, 51, respectively. The clock inputs of all three flip-flops 50, 52 are connected to a single clock input line which is connected to the single clock input $c$, and receiving its signal from the clock source 46. A first AND-gate 53 is connected with its two inputs to the output of FF 50 and to the complementary output of FF 51. The two inputs of a second AND-gate 54 are connected to the positive output of FF 51 and to the complementary output of FF 52. AND-gate 53 provides the frequency fn1; AND-gate 54 provides the frequency fn2. D flip-flops are well known articles of commerce; they are available as integrated circuits. An integrated circuit chip having four D flip-flops on one chip is available, commercially, under No. SN 74,175.

Figure 3B:
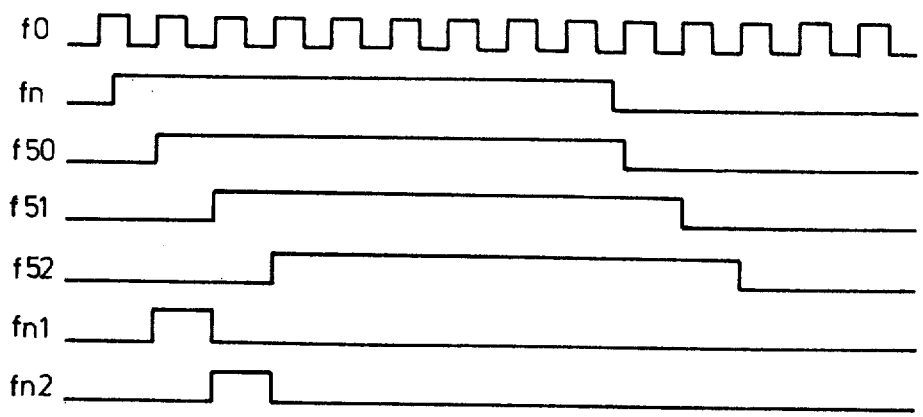

Operation, with reference to FIG. 3b: The clock frequency f0, applied to clock terminal $c$ is shown in the first line of FIG. 3b. A single pulse fn derived from speed signal generator 20' is shown in the second line. The flanks of these pulses do not necessarily coincide with the flanks of the clock frequency $f0$. The first D flip-flop synchronizes the frequency fn with the flanks of the clock frequency f0. The D flip-flop 50 receives the logic signal at its control input D and, at the leading edge of the next following clock pulse f0, it changes state. This is shown in FIG. 3b at the third line, pulse diagram f50, which illustrates the output signal from the first FF 50. The output signals of the two subsequent FF's 51, 52 are shown in FIG. 3b at f51 and f52, respectively. They are shifted with respect to the pulse f50 by one, and two clock cycles of the frequency f0, respectively. The first AND-gate 53 provides a 1-signal when the first FF 53 has already changed state, but the second FF 51 has not yet changed state. The resulting time scan frequency $fn1$ is shown in the penultimate line of FIG. 3b. The second AND-gate 54 provides a 1-signal when the speed signal $fn$ has been transferred to the second FF 51 but not yet to the third FF 52; the time-shifted pulse is shown in the last line as $fn2$ in FIG. 3b.

The two time-shifted speed signals $fn1$ and $fn2$ thus are shifted with respect to each other by exactly the cycling time of the clock frequency f0. The pulse length or pulse duration of the frequencies $fn1$ and $fn2$ is equal to a full cycle or period of the base frequency f0.

Referring back to FIG. 2, control of the timing counter 44 by the signal scanner 43 will now be clear. The load input of the storage stage 45 and the reset input of the timing counter 44 respond, respectively, to the leading flanks of the frequencies $fn1$, and $fn2$, respectively. The leading edge of the pulse $fn1$ transfers the final count in timing counter 44 to the storage stage 45. The leading edge of the pulse fn2 resets the timing counter 44.

Timing counters such as the timing counter 44 of FIG. 2 are commercially available as integrated circuit components, for example under No. SN 74,163. Storage stage 45 can be an integrated component SN 74 75; and the element SN 75,191 may be used for the division counter 48.

Figure 4:
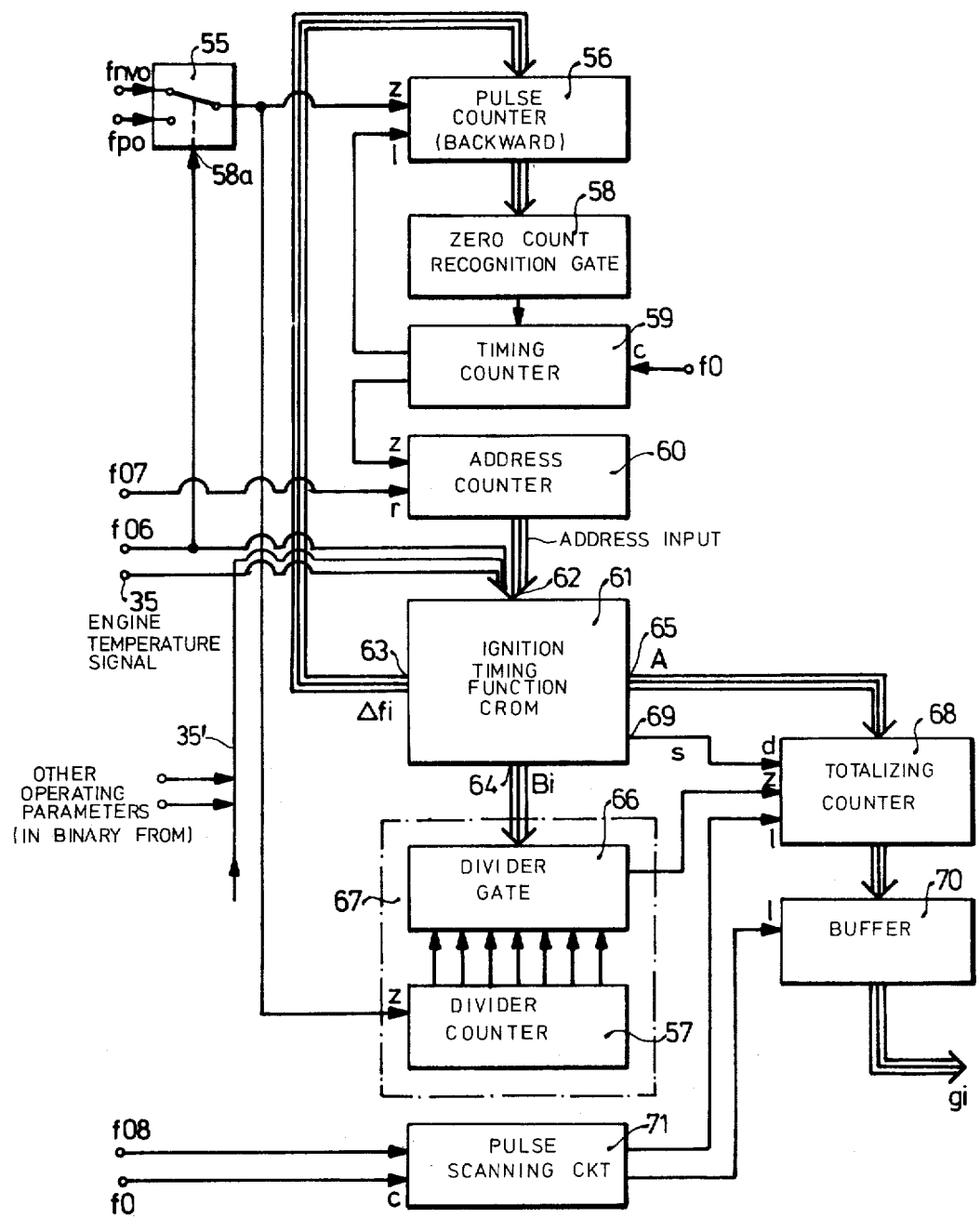
FIG. 4 is a schematic block diagram of a function storage and transform stage.

The function storage and transform stage 34 is illustrated in greater detail in FIG. 4. The input to stage 34 is an electronic transfer switch 55 which, depending on its switching position, either applies the multiplied speed signal frequency $fnv$, or a signal having the frequency fp representative of inlet manifold vacuum applied thereto. The respective input frequency, which is shown as $fnv0$ and $fp0$ in FIG. 4 is applied to the counting input z of a pulse counter 56. Pulse counter 56 is a backward counter. The output from switch 55 is, additionally, connected to the count input z of the divider counter 57 which forms part of a discrete multiplier 67. The control input 58a of the transfer switch 55 has a timing marker signal $f06$ applied thereto, derived from the frequency divider circuit 47 (FIG. 2). The signal $f06$ determines the timing of the transfer of switch 55 from the position shown to connection of its output to the frequency $fpo$.

The binary number output from the pulse counter 56 is connected to a zero count recognition state 58. The output of gate 58 is applied to a timing counter 59 which has the clock signal f0 applied at its clock input c. The output of the timing counter 59 is connected to the loading input of the pulse counter 56 and to the counting input z of an address counter 60. The reset input r of the address counter is connected to the frequency divider circuit 47 (FIG. 2) which applies a timing marker frequency f07. The timing marker frequency f07 resets the address counter 60 after elapse of time to transform the input signal in accordance with the stored transfer function.

The basic, central component of the function storage and transfer stage 34 is an ignition timing function memory 61. This memory is a read only (ROM) memory, having an address input 62, and three outputs 63, 64, 65. ROM's are available commercially, to various storage capacities and readily available to storage capacities of 4,096 bits. If, for experimentation, and for example to design the system for a specific engine, it is desired to change the transfer function stored in the ROM 61, then a programmed ROM (PROM) should be used; a commercially available PROM is made by Intel under No. 1702.

The binary number output from address counter 60 is applied to the address input 62 of the ROM 61. Additionally, the binary number representative of engine temperature (0 or 1) is applied to the address as well as to the timing marker frequency $f06$, derived from the frequency divider 47 (FIG. 2). The timing marker frequency f06 is either a 0-signal or a 1-signal. The signal on terminal 35, likewise is either a 0-signal or a 1-signal. The address input 62, will, therefore, have a binary number applied thereto which has two more digits than the number of digits of the address counter 60. Since ROM's with very high storage capacity are commercially available, additional address inputs 62 may be connected to the ROM 61 in order to determine the ignition timing with respect to other parameters as well, for example exhaust composition. Additional address input lines are shown schematically as cable 35', to which signals representative of other operating parameters, in binary form, are applied. These signals may have more than one digit, and thus represent, in decimal system, more than two states; the only requirement is suitable addressing of the ROM 61 in parallel form by additional lines, or serially, if desired.

The first numerical output 63 of ROM 61 is connected to the binary number input of the pulse counter 56 and provides interval difference values $\Delta fi$. The second stage output 64 is connected to the binary number input of a divider gate 66 which, together with the divider counter 57 forms a serial multiplier 67. Such serial multipliers, known as discrete multipliers are known in the literature and have been described, for example, in "Logic Design with Integrated Circuits", William E. Wickes; 1968, pp. 225 to 236. They are available commercially as integrated circuit elements under the designation SN 74 97.

The third storage output 65 of the ignition timing function memory 61 is connected to the binary number input of a totalizing counter 68 which, together with buffer 70, corresponds to the totalizing counter 36 of FIG. 1. A single digit output 69 of the ROM 61 is connected to a count direction input d of the totalizing counter 68. The output of divider gate 66 is connected to the count input z of counter 68.

The binary number output of totalizing counter 68 is connected to a buffer 70 which stores the final count state of totalizing counter 68 in form of a binary number $gi$ and provides the number at its output.

A pulse scanning circuit 71 has the time marker frequency $f08$ applied thereto from the frequency divider circuit 47 (FIG. 2). The clock input c of the pulse scanning circuit has the frequency f0 from the clock source 46 (FIG. 2) applied. Two outputs of the pulse scanning circuit 71 are connected to the loading inputs 1 of the totalizing counter 68, and of the buffer 70, respectively.

Figure 5:
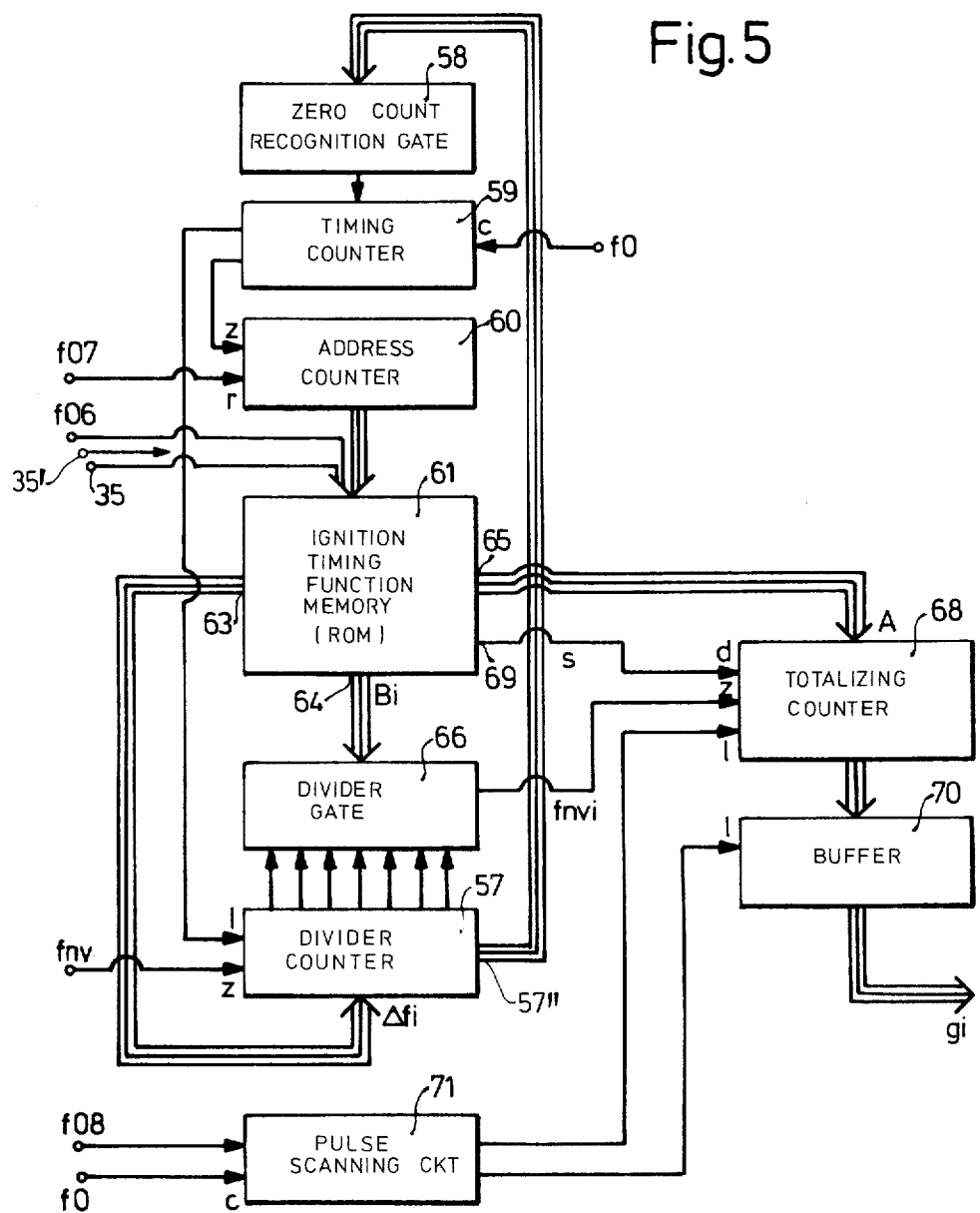
FIG. 5 is a schematic diagram of another embodiment of the function storage and transform stage.

The circuit of FIG. 5 differs from the circuit of FIG. 4 only in that the divider counter 57' simultaneously takes on the function of the pulse counter 56. The first numerical output 63 from the ignition timing function memory, that is from ROM 61, is therefore connected to the binary number input of the divider counter 57'. The divider counter 57' also has a binary number output connection 57'' which is connected to the input of the zero count recognition gate 58. The divider counter 57' has a load input 1 which is connected to the output of the timing counter 59. The remaining connections and elements are all similar to those of the circuit of FIG. 4, have been given the same reference numerals and designations, and need not be described again. The transfer switch 55 has been omitted from FIG. 5; it is connected in advance of the count input $z$ of the divider counter 57'.

Figure 6:
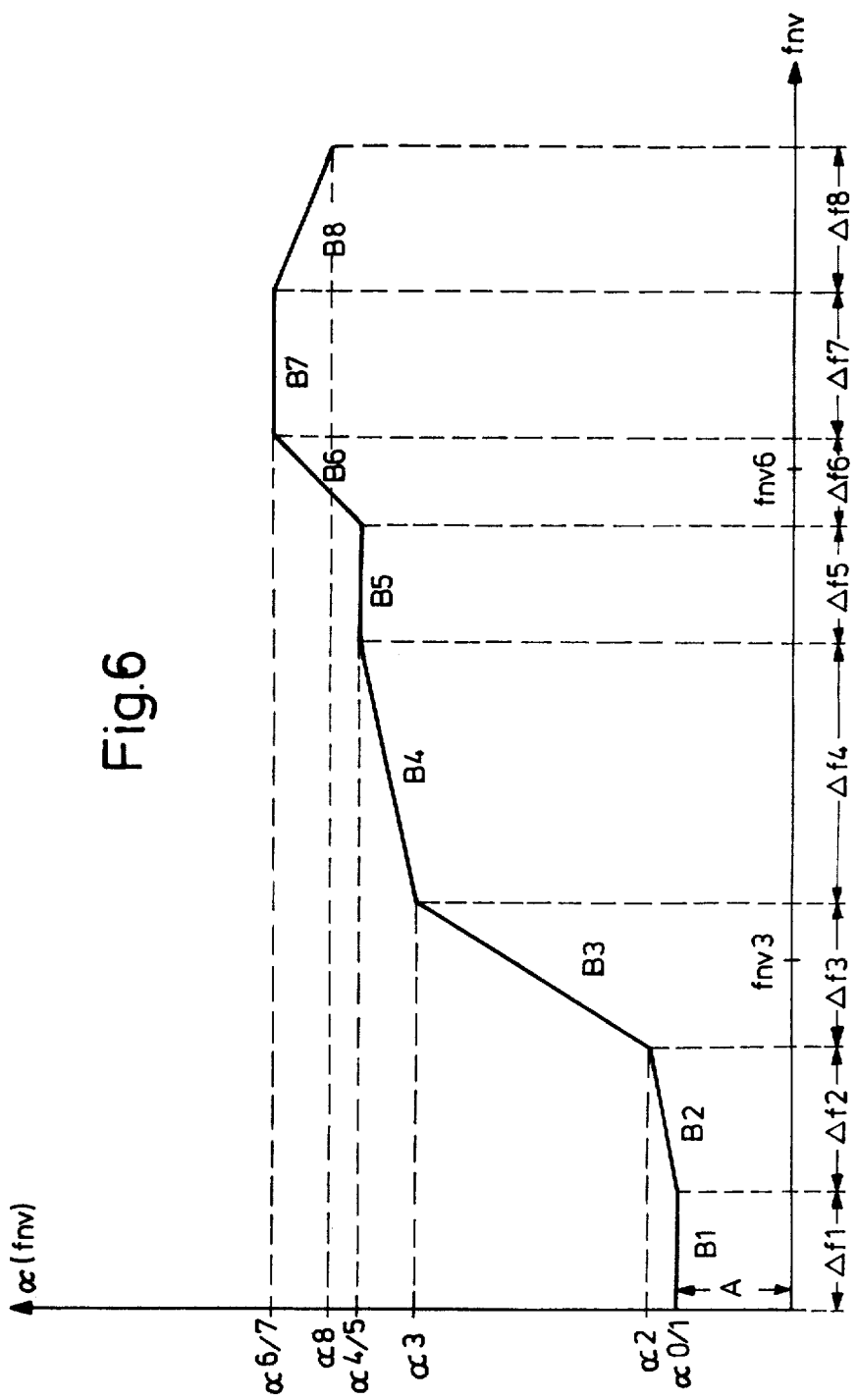
FIGS. 6, 7, 8 and 9 are graphs used in the explanation of the operation of the system of the invention, and illustrating the generation of digital numbers representing ignition timing, with respect to time.
Figure 7:
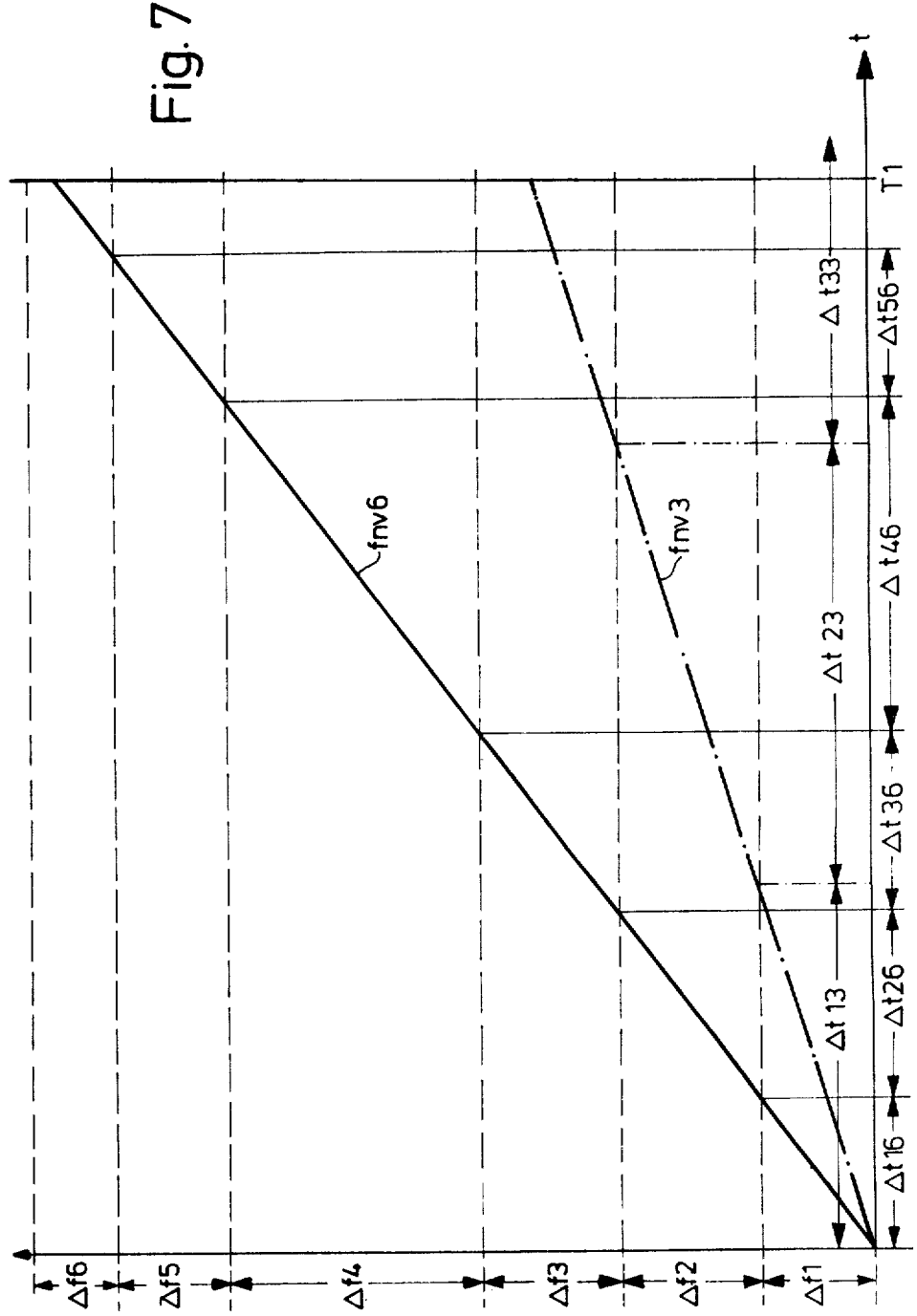
Figure 8:
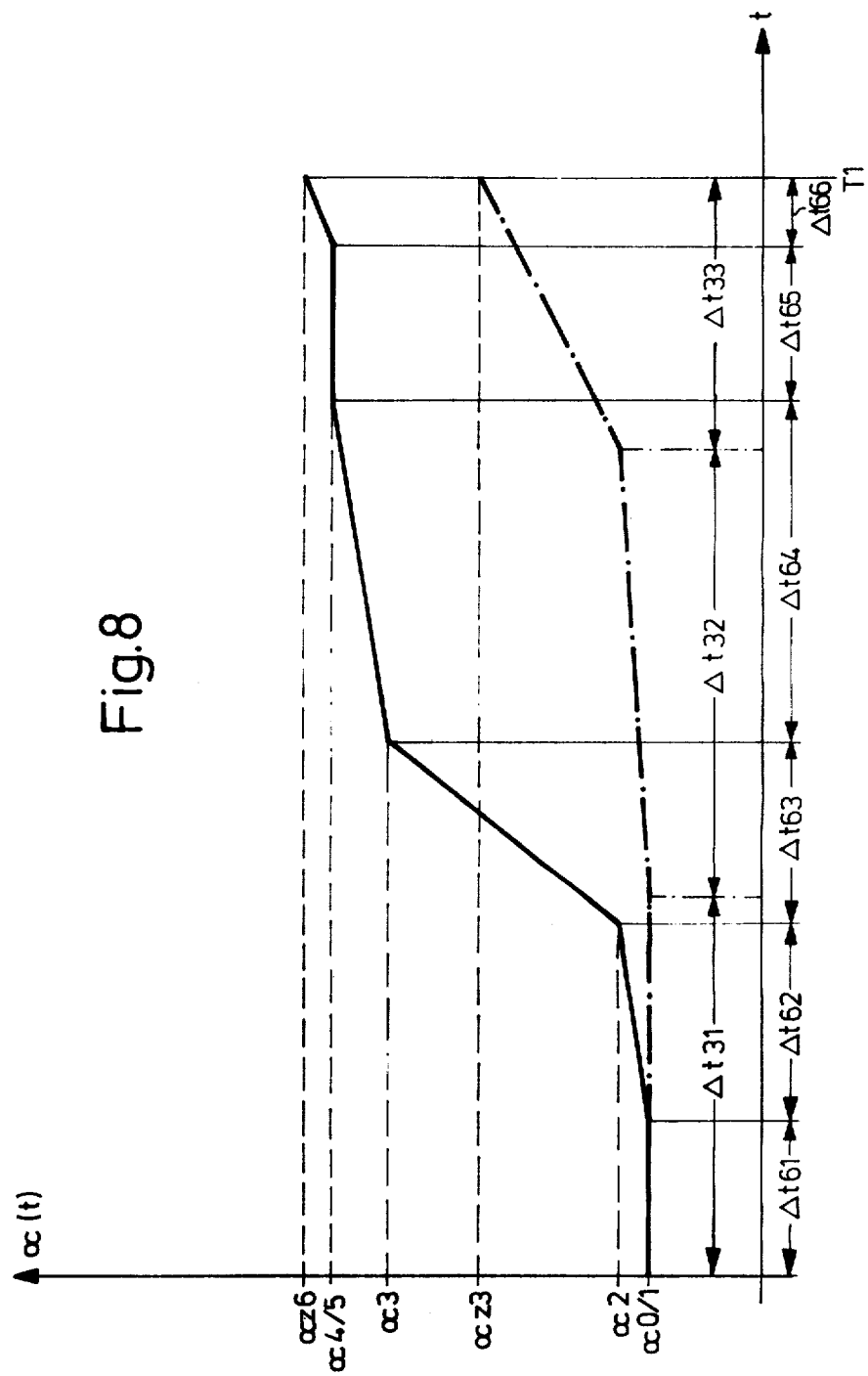
Figure 9:
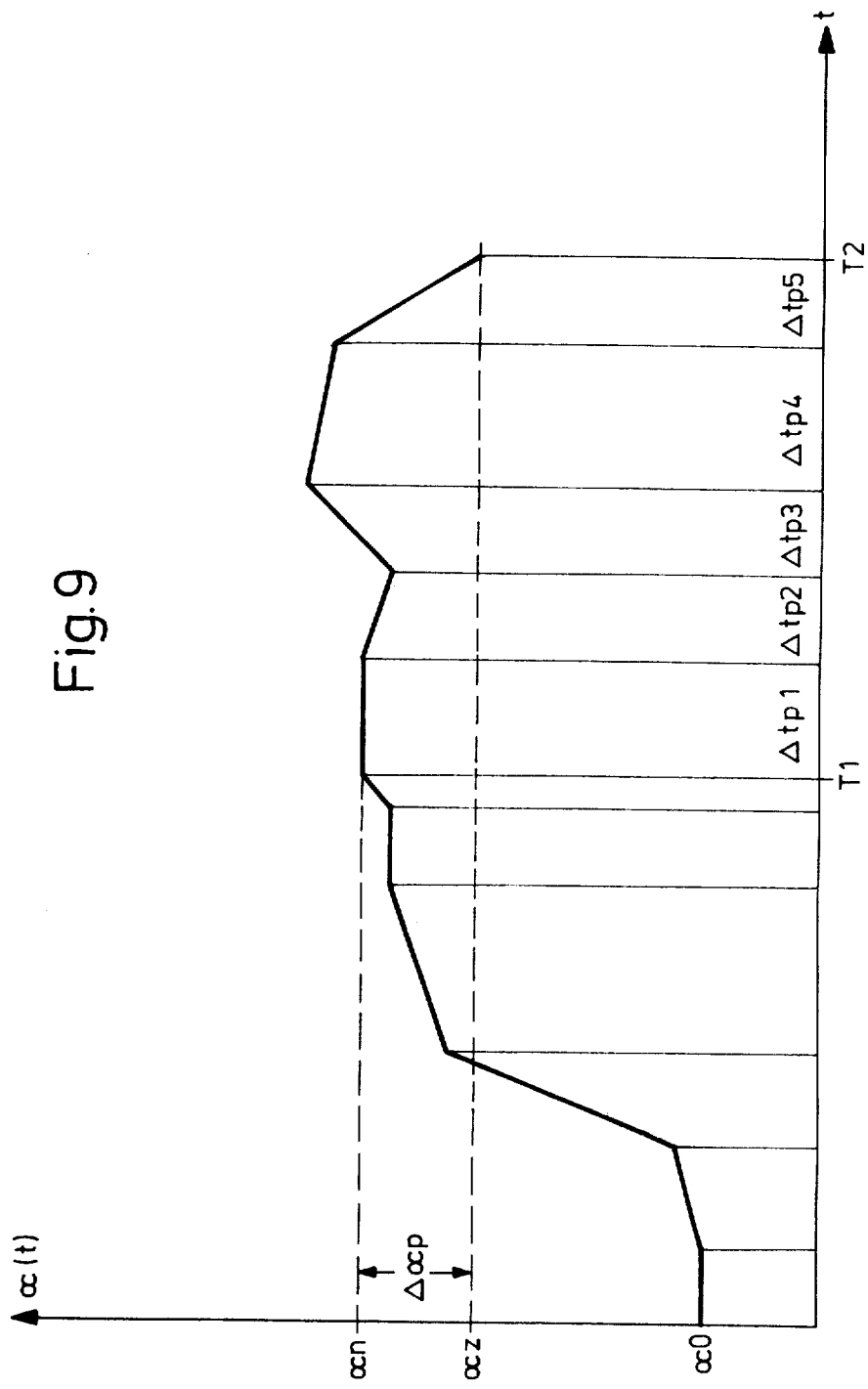

FIG. 6 shows the transfer function of the firing angle which is empirically determined for a specific internal combustion engine. The curve which is empirically measured, for optimum firing time of the spark plug, with respect to speed (abscissa) is approximated by curve portions which are straight from one interval to the next. The firing angle $\alpha$, on the ordinate, is indicated in degrees in advance of UDC position. The curve of FIG. 6 graphically illustrates the dependence of optimum firing angle on speed of the internal combustion engine. The scale of the abscissa is not speed, directly, but rather the multiplied speed frequency, proportional to speed, $fnv$. The entire speed or, rather, the frequency range, is sub-divided into eight frequency intervals $\Delta f1$ to $\Delta f8$. The straight lines which approximate the transfer function curve within the various intervals have slopes B1 to B8. The values of these slopes are positive in the intervals $\Delta f2$, $\Delta f3$, $\Delta f4$ and $\Delta f6$. They are negative in the interval $\Delta f8$ and in the other three intervals the slopes are 0. FIG. 7 illustrates how two selected frequencies fnv3 and fnv6 are transformed into time intervals by means of the frequency pulse counter 56 (FIG. 4) with respect to the frequency intervals $\Delta f1$, $\Delta f2$ . . . . . FIG. 8 illustrates the actual function generation and signal transform operation, with respect to time, at the two selected frequencies $fnv3$ and $fnv6$. FIG. 9, finally, illustrates how a second function generating sequence can follow the first function generating sequence, in which the first function generating sequence is speed dependent, whereas the second function generating sequence is dependent on inlet manifold vacuum.

Operation, with reference to FIGS. 6 to 9: The transformation of the frequency, or rather speed intervals into time intervals will be explained first, with specific reference to FIGS. 4, 6 and 7. It is assumed that the transfer switch 55 is in the solid-line position of FIG. 4, so that the multiplied speed frequency $fnv$, representing instantaneous angular position of the crankshaft is applied to the two counters 56, 57. The pressure relationships existing in the inlet manifold are, for the time being, not considered.

Before the function transform cycle begins, a fixed binary number is stored in the frequency counter 56; this number is derived from the output 63 of the ignition timing and function memory, that is, ROM 61. This number is representative of the width of the first frequency interval $\Delta f1$. This binary number is counted at the multiplied speed frequency, in backward direction. After a time interval $\Delta t1$ has elapsed, frequency counter 56 will reach zero state. The duration of this time interval $\Delta t1$ is: (a) proportional to the width of the frequency interval $\Delta f1$, that is, to the number first entered into the frequency counter 56, and (b) proportional to the counting frequency $fnv$. The relationships are illustrated in FIG. 7 for two selected counting frequencies $fnv3$ and $fnv6$. The corresponding time intervals are indicated at $\Delta t13$ and $\Delta t16$.

When the frequency counter 56 has reached zero count condition, gate 58 recognizes the zero count state and provides a pulse to the timing counter 59. Timing counter 59 transfers this zero recognition pulse to the count input $z$ of the address counter 60 which increments its count state by one. The address counter 60 is connected to the address input 62 of the ROM 61. ROM 61 now provides, at its outputs 63, 64, 69 binary numbers which are characteristic for the second frequency interval $\Delta f2$. The timing counter 59 also transfers the zero recognition pulse to the loading input 1 of the frequency counter 56 so that the frequency counter 56 will have a binary number therein which has a value characterizing the width of the second frequency interval $\Delta f2$, that is, has a value which is proportional to the width of the second frequency interval $\Delta f2$. This binary number is counted, as in the first frequency interval at the frequency $fnv$.

As soon as frequency counter 56 again reaches zero count state, address counter 60 is stepped again, as previously described and the ROM 61 furnishes binary numbers which characterize the third frequency interval $\Delta f3$. The binary number which characterizes the interval width $\Delta f3$ (see FIGS. 6, 7) is transferred to the pulse counter 56 which, again, starts to count backwards from that number until it reaches zero. The described cycles repeat periodically at each subsequent frequency interval $\Delta fi$.

The frequency transformation is not carried out until all frequency intervals are counted; rather, the frequency divider 47 (FIG. 2) determines a time T1, by providing an output pulse at its output $f07$, at which time the frequency transformation is terminated and the address counter 60 is reset so that the address applied to terminal 62 again will be that which causes the ROM 61 to provide the binary number characteristic of the first frequency interval $\Delta f1$.

FIG. 7 illustrates that the number of the frequency intervals $\Delta fi$ increases as the counting frequency $fnv$ increases. At a low counting frequency, for example at the counting frequency $fnv3$, the counting process is interrupted at the third interval $\Delta f3$. At a higher frequency $fvn6$, the counting process can continue to the sixth interval. When the internal combustion engine is driven at maximum speed, then the entire characteristic function of FIG. 6 must be considered. The counting characteristic which would appear in FIG. 7 would then be so steep that all eight intervals from $\Delta f1$ to $\Delta f8$ are counted with the time T1.

Frequency counter 56 could equally well be constructed as a forward counter; gate 58 then can be replaced by a binary comparator which provides an output signal when the count state of frequency counter 56 corresponds to the interval difference value $\Delta fi$, which is derived from the output 63 of ROM 61. Frequency counter 56 then would be reset after it recognizes the limit of its permitted count, as determined by the number derived from the output 63 of memory 61, and all intervals would be counted in forward direction. This solution was not selected in the embodiments of FIGS. 4 and 5 since somewhat greater requirements would be placed on the actual instrumentation of the system; binary number comparators are somewhat more complicated and require more circuit elements than a zero recognition gate which, for example for gate 58, may be a single NOR-gate, or a single multiple input AND-gate.

The function memory 61 provides a binary number at its second output 64 during each frequency interval $\Delta fi$ which characterizes the slope of the curve during the specific interval; this number is indicated at Bi in FIG. 4, and applied to multiplier 67 as a multiplying factor. Multiplier 67 multiplies the already multiplied speed (or instantaneous angle) frequency $fnv$, derived from transfer switch 55 (FIG. 4) with this factor Bi. Due to the specific properties of the discrete multiplier, described in the above referred to text by Wickes, the factor Bi must be smaller than 1. The output frequency of the divider gate 66 thus will be less than the frequency $fnv$, and is indicated as $fnvi$. This structural requirement, imposed by the element 67, must be considered when the multiplication factor of the circuit of FIG. 2 is determined.

The totalizing counter 68 totalizes the outputs of the divider gate 66 during the various intervals $\Delta fi$. At the end of a transform cycle, the pulse scanning circuit 71, after sensing or scanning the timing marker f08, transfers the final state of the totalizing counter 68 into the buffer 70; thereafter, the totalizing counter is set to an initial value representing a number A, derived from the third output 65 of the ignition timing function memory 61. This initial value A is indicated in FIGS. 6, 8 and 9. It characterizes the firing angle $\alpha 0$ which is that firing angle required at very low engine speeds.

For purposes of illustration, a special case has been selected for FIG. 6 in which the totalizing counter 68 retains the count state of number A during the entire first interval $\Delta f1$, since the slope of the characteristic function curve is 0. Correspondingly, the binary number B1 available at output 64 of ROM 61 is also equal to 0 and the divider gate 66 does not provide pulses during the first interval $\Delta f1$.

Considering now the second interval, $\Delta f2$. Zero count recognition gate 58 responds to recognize the zero count state of pulse counter 56 and, by its output, steps address counter 60 by one number, so that the timing function memory 61 provides that binary number which is characteristic for the second interval $\Delta f2$. The binary number B2, which characterizes the slope of the curve in the second frequency interval $\Delta f2$ differs from zero. Divider gate 66 of discrete multiplier 67 thus provides a pulse sequence which has a frequency proportional to the product of the multiplied speed frequency $fnv$ and binary number B2. The interpolation counter 68 counts, therefore, along the characteristic curve portion having the slope B2 of FIG. 6.

The slope changes in the third interval $\Delta f3$, in an increasing direction. A higher binary number B3 is applied to the binary input of the divider gate 66 from the output 64 of ROM 61. The frequency of the pulse sequence provided by the divider gate 66 is thus higher; the counting speed of the totalizing counter 68 increases so that the count state follows the curve, in accordance with FIG. 6.

The fourth interval $\Delta f4$ has a smaller binary number; the fifth interval has a slope of zero, so that the binary number B5 is likewise equal to zero. The count state in totalizing counter 68 does not change. The count state increases in the sixth interval. It remains constant in the seventh interval.

A change results in the eighth interval $\Delta f8$, since the slope B8 of the characteristic curve has a negative value. The fourth output 69 of ROM 61 provides an output number applied to the count direction input $d$ of totalizing counter 68, to switch count direction in the counter 68. In the eighth interval, therefore, totalizing counter 68 counts backwardly, and the count state therein which, in the preceding count intervals has increased, or remained constant, now decreases.

The firing angle $\alpha i$, reached at the end of the various count intervals $\Delta fi$ is indicated at the ordinate of FIG. 6. The entire characteristic curve is considered, that is, forms a portion of the frequency transformation only if the internal combustion engine runs maximum speed. The relationships at lower speeds are indicated in FIGS. 7 and 8.

The chain-dotted characteristic line $fnv3$ of FIG. 7 is representative of a low engine speed. The pulse counter 56, as well as the totalizing counter 68, terminate their count after the third interval $\Delta f3$, and when the time T1 has elapsed. The totalizing counter 68 then reaches a count state which corresponds to the firing angle $\alpha z3$ of FIG. 8.

The relationships arising at the higher speed $fnv6$ is indicated by the solid lines in FIGS. 7 and 8. The final count is stopped at this frequency only in the sixth interval $\Delta f6$. At each speed of the internal combustion engine, the count cycle of the totalizing counter 68 is carried out for such time that a counter state is reached which is a measure of the optimum firing angle at the respective speed.

The timing function transformation cycle at the speed frequency $fnv6$ is again shown in FIG. 9, drawn to a shortened scale. A second timing function transformation cycle follows the first time period T1. The second cycle, between T1 and a further time period T2 considers the dependence of the firing angle $\alpha$ on engine loading, as represented by inlet manifold vacuum. The timing of instant T1, at which a firing angle $\alpha n$ has been reached was dependent only on speed. After the time instant T1, the time marker frequency $f06$ (FIG. 4) provides a different binary signal to the address input 62 of the timing function memory 61, so that the memory 61 provides at its output 63, 64, 65 and 69 different values, which correlate induction or inlet manifold vacuum and firing angle. Address counter 60 is set by the time marker frequency $f07$ at, or immediately in advance of the time period T1 on that count state which is assigned to the first count interval which considers change in induction pipe, or inlet manifold pressure.

The function of ignition timing with respect to induction pipe, or inlet manifold pressure (or rather, vacuum) is considered in the timing intervals between time T1 and T2 (FIG. 9). The output frequency $fp$ of the oscillator 28, of course, covers a frequency range which does not start with frequency zero. In the first measuring interval $\Delta tp1$ (FIG. 9), therefore, a frequency range which differs substantially from zero must be analyzed. In a practical example, the frequency $fp$ of the oscillator 28 (FIG. 1) changes in a range from between 80 kHz to 120 kHz. The initial frequency of 80 kHz is first counted in frequency counter 56 (FIG. 4) after transfer switch 55 has changed over to the contact terminal *fpo*. This occurs at time instant T1. From this time instant onward, pulse counter 56 has the frequency representative of inlet manifold vacuum *fp* applied thereto. The characteristic transfer function curve, illustrated in FIG. 9, for purposes of illustration, in the initial interval Δ*tp*1 has a slope of zero. Thus, the count state of totalizing counter 68 does not change at all, until the entire initial frequency of 80 kHz has been counted.

In subsequent intervals, the totalizing of the pressure relationships are continued exactly as the totalizing of pulses representing speed relationships. The second, overall totalizing cycle ends at time T2, as determined by the time marker pulse *f*08 (FIG. 4). In the example of FIG. 9, four further time intervals Δ*tp*2 to Δ*tp*5 are considered. Due to the relationship between inlet manifold pressure and ignition firing angle, an additional change in firing angle Δα*p* will result, which is added to the firing angle α*n*, FIG. 9, algebraically, to result in a final firing angle α*z*. This addition is carried out in the totalizing counter 68, which starts the second counting cycle between time periods T1, T2 with the state the counter had at the end of the first time period T1. The additive interrelationship of the change in ignition angle is the same as that customarily used in mechanical ignition angle adjustment apparatus, in which a centrifugal controller is provided to effect control action with respect to speed, and a diaphragm chamber connected with a tube to the inlet manifold effects, by algebraic addition, change in firing angle based on inlet manifold vacuum.

At the instant of time T2, determined by the marker pulse *f*08, the totalizing counter 68 will have a count state which corresponds to the eventual firing angle α*z*. The time marker frequency *f*08, which also marks the time period T2, controls the totalizing counter as well as the buffer 70 through pulse scanning circuit 71. Pulses applied from pulse scanning circuit 71 to the counter 68 and to the buffer 70, and derived from separate outputs of the pulse scanning circuit 71, are slightly time-shifted with respect to each other. A first pulse, for example applied to the load input of the buffer 70, transfers the count state from the totalizing counter 68 into the buffer 70; immediately subsequent thereto, the counter 70 is reset so that the initial count number A can be stored in the counter 68. This initial value A — as above discussed — determines the base ignition angle at very low speeds. It is needed for the next ignition angle calculation cycle.

The counter 56 and the divider counter 57 have the same counting frequency applied if the circuit in accordance with FIG. 4 is used. Since the divider counter 57 only considers the pulse train frequencies which are provided by the various counter stages, the circuit can be changed and be constructed in accordance with FIG. 5. The divider counter 57' in FIG. 5, which corresponds to the divider counter 57 in FIG. 4, is thus used simultaneously as a frequency counter. The divider counter 57' is set to binary number which represents, or characterizes the interval difference Δ*fi* by receiving an output directly from the output 63 of the timing function memory 61. The counter state of the divider counter 57' is applied directly from output 57'' to the zero count recognition gate 58, which provides an output signal when it recognizes a count state of divider counter 57' equal to zero. The timing counter 59 then causes the address counter 60 to step by one digit so that a new address will be applied to the timing function memory to store a new initial number representative of the new interval difference value Δ*fi* in the divider counter 57'.

All the outputs of the various stages of the divider counter 57' are applied to the divider gate 66. Divider gate 66 and divider counter 57' cannot be connected together as a single integrated circuit (as in the circuit of FIG. 4) since the divider counter 57 must supply a binary number output. The divider gate 66 in the circuit of FIG. 5 consists of a group of AND-gates, as described in the above referenced textbook by Wickes.

In both the circuits of FIGS. 4 and 5, the address counter 60 may use the integrated circuit SN 74 163; the divider counter 57, as well as the totalizing counter 68 may use the integrated circuit SN 74 191, and the buffer 70 may use the integrated circuit SN 74 175. The buffer 70 has a D flip-flop for each binary digit.

Figure 10:
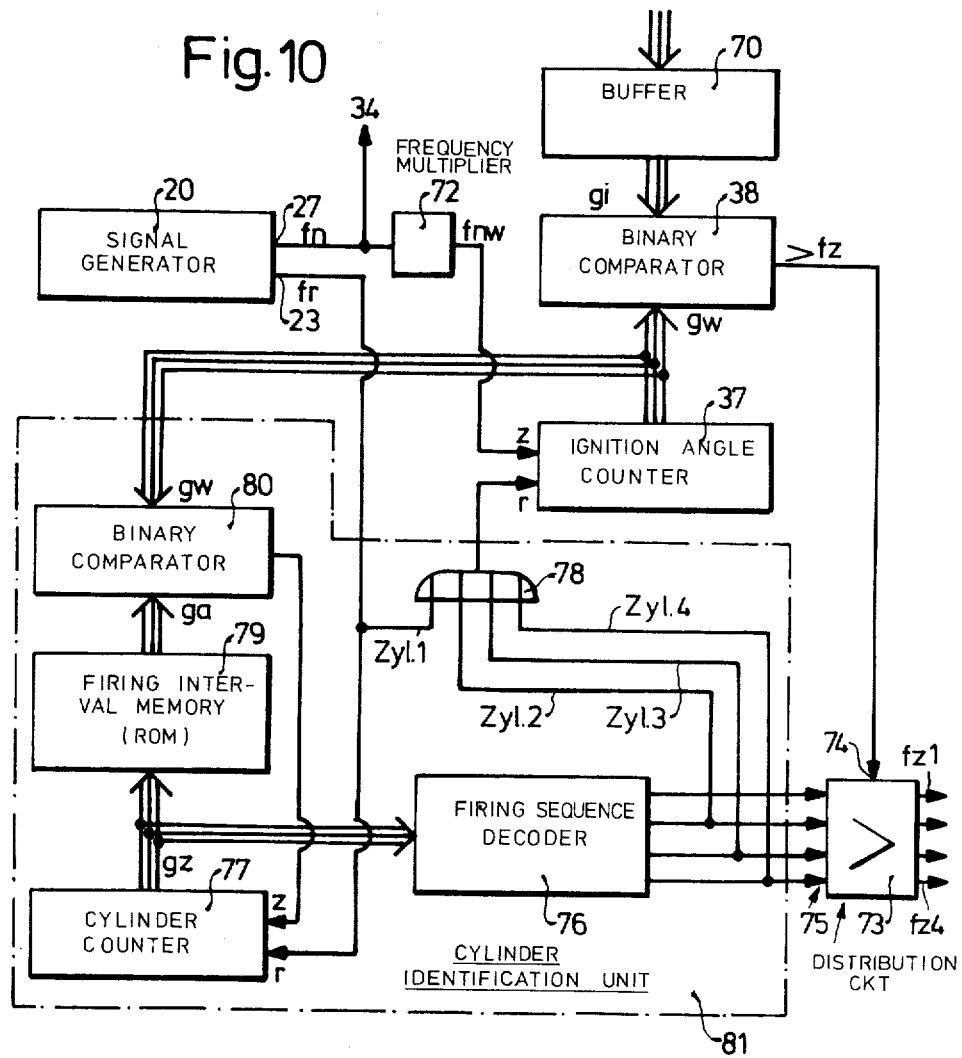
FIG. 10 is a block circuit diagram of a trigger circuit for a multi-cylinder internal combustion engine.

FIG. 10 illustrates the binary comparator circuitry connected to the function storage and transformation stage which triggers the operating event, in the illustrated example, ignition of the internal combustion engine. The speed signal output 27 of the signal generator 20 (FIGS. 1, 10) and which carries the speed signal frequency *fn*, is connected on the one hand to the function storage and transform stage 34 (compare also FIG. 1) and, on the other, to a frequency multiplier 72. Frequency multiplier 72 provides a multiplied frequency to the count input *z* of the ignition angle counter 37. The binary number output of the ignition angle counter 37 and the output of buffer 70 (FIGS. 4, 5) are connected to respective binary number inputs of the binary comparator 38. The output of the binary comparator 38 is connected to the control input 74 of an electronic distribution circuit 73.

The electronic distribution circuit 73 is selectively rendered effective by a cylinder identification unit 81. A firing sequence decoder 76, which receives binary numbers from a cylinder 77, provides output signals at cylinder selector terminals 75, connected to the distribution circuit 73. Three of the output lines of the decoder 76 are connected to respective inputs of an OR-gate 78; those are the outputs — for a four-cylinder engine — denoted Zyl 2, Zyl 3, Zyl 4. The output of the OR-gate is connected to the reset input *r* of the ignition angle counter 37. A fourth input of the OR-gate 78, denoted Zyl 1 is connected to the output 23 of the signal reference generator 20'' of the signal generator 20 (FIGS. 1, 10), and receives the reference frequency *fr*.

The output of the cylinder counter 77 is a binary number *gz*, connected to the firing sequence decoder 76 and to the address input of a firing interval memory 79. Firing interval memory 79 is a read-only memory (ROM). The stored output of ROM 79 is a binary number *ga* which is connected to the input of a binary number comparator 80, the other input of which receives the output from the ignition angle counter 37. Comparator 80 compares the two numbers *ga* and *gw* and, upon coincidence, provides a signal at its output which is applied to the count input *v* of the cylinder counter 77. The reset input *r* of cylinder counter 77 is connected to the output 23 of signal generator 20, and receives the reference frequency *fr*.

The elements or stages 76 to 80 together form the cylinder identification unit 81, as schematically indicated by the chain-dotted framing line. The cylinder identification unit 81 provides a reference pulse at the output of the OR-gate 78 for each one of the cylinders; the signal generator 20, at output 23 provides only a single reference pulse $fr$ for each crankshaft revolution. The cylinder identification unit 81 can be eliminated if the signal generator 20', providing the $fr$ signal, is so formed that the switch 21 thereof (FIG. 1) closes several times for each revolution of the crankshaft, the number of closings corresponding to the number of cylinders so that a reference pulse for each cylinder is provided.

Operation, with reference to FIG. 10: Initially, the operation without the cylinder identification unit 81 will be described. The signal generator 20 provides a reference pulse $fr$ at a predetermined angular position in advance of UDC position, for example 40° in advance of UDC position of a specific cylinder. The reference pulse $fr$ from terminal 23, applied to the reset terminal $r$ of the ignition angle counter 37, resets the ignition angle counter 37 to zero count state. Thereafter, the ignition angle counter 37 counts all the output pulses of the frequency multiplying stage 72, that is, the pulses $fnw$ supplied thereby. When the count state of counter 37 is greater than the number stored in buffer 70, that is, when the number $gw$ is larger than the number $gi$, binary comparator 38 provides an output pulse $fz$ at the output terminal thereof. Output pulse $fz$ initiates the operating event, in the selected example it initiates ignition. The reason why the comparison condition of "greater than" is selected will be discussed in connection with FIG. 11. Ignition thus is delayed as the number stored in the buffer 70 increases. Referring again to FIGS. 6, 8, 9, which show the relationship of the firing angle $\alpha$ in degrees before UDC position: the characteristic curves in these FIGS. provide a firing angle which increases with increasing advance of ignition. Thus, the buffer 70 must have a low binary number if early, that is, advanced ignition is desired. The totalizing counter 68, in accordance with the embodiment of FIGS. 4 and 5, therefore must count backward if the slope $Bi$ of the characteristic curve of FIG. 6 is positive, and must count forward when the slope $Bi$ is negative. The totalizing counter 68, in the example of FIG. 6, counts forward only in the eighth interval $\Delta f8$.

The two counters 68, 37, the count state of which is compared in binary counter 38, can be so arranged that the count directions are reversed with respect to those previously described. The totalizing counter 68 then counts forward when the slope of the characteristic curve $Bi$ is positive. The ignition angle counter 37 then must be set for a predetermined maximum value at each reference pulse $fr$ and thereafter count the frequency multiplied pulses $fnw$ in backward direction.

The multiplication factor of the frequency multiplier 72 has to be matched to the slopes $Bi$ expected of the function curves of FIGS. 6, 8, 9, in such a manner that ignition is triggered at the desired ignition angle. The frequency multiplier $fnw$ can be omitted if, by suitable selection of the multiplication factors $Bi$, the multiplier 67 (FIG. 4) provides only so few pulses per unit time that the number thereof can be directly compared with the number of the pulses provided directly by the signal generator 20' at output terminal 27, that is, pulse train $fn$.

Multi-cylinder internal combustion engines may require different firing angles for the different cylinders thereof under certain cylinder layout conditions. The geometric arrangements of the various inlet manifold lines and inlet stubs frequently provide different flow resistances in the induction lines and fuel-air mixture supply lines with respect to the various cylinders; thus, due to the different flow resistance, the degree of filling of the various cylinders may be different. As has been referred to above, the mixture must be ignited earlier if the cylinder fill is poorer. The firing angle control system of the present invention permits to precisely set the firing angle, and can also recognize differences in degrees of filling of the cylinders. For example, the angle counter 37 can be reset at a given cylinder at 40° before UDC position whereas, when the ignition for another cylinder is to be determined, it is reset at 45° before UDC position.

Different reset angles can readily be set for different cylinders if the signal generator source 20'', providing the $fr$ pulses, has a separate switch 21 for each cylinder. The particular firing time can then be adjusted by selective placement of the various cams 22 with respect to a reference position of the crankshaft. This mechanical adjustment is difficult and can hardly be carried out with the requisite accuracy. The cylinder identification and marker unit 81 may therefore be preferred. Unit 81 electronically compensates for different flow conditions of fuel-air mixtures to different cylinders, by electronically storing different binary numbers to compensate for these differences in flow resistance, and geometric arrangement of the cylinders with respect to each other and with respect to the carburetor, or main inlet manifold induction pipe. The same signal generator 20 may then be used for different types of engines, that is, a signal generator 20 which includes a unit 20'' having only a single switch 21 and a single cam 22. The conditions for accurate firing of the various cylinders in a multi-cylinder internal combustion engine are indicated in FIG. 11. The binary number $ga$ represents the angular distance of the various zero markers from each other. The various zero markers each reset the ignition angle counter 37.

The reference pulse $fr$ from signal generator unit 20', on the one hand, resets the ignition angle counter 37 over the OR-gate 78 and, on the other, resets the cylinder counter 77. Decoder 76, connected to the cylinder counter 77, the provides a signal at its first output Zyl 1'. The decoder 76 may well be a binary-decimal (B/D) decoder. B/D decoders are customary in counting circuits. The binary number $gz$ representative of cylinder 1 is additionally applied to the address input of the firing interval memory 79. Firing interval memory 79 provides a binary number $ga$ which characterizes the distance between the zero mark of the first and of the second cylinder. The angle counter 37 in the meanwhile counts the output pulses $fn$ of the signal generator unit 20' (directly, or as multiplied by multiplier 72). The count state $gw$ of the ignition angle counter 37, as well as the binary number $ga$ are applied to binary comparator 80. When the star-wheel 24 has passed an angle which is equal to that of the desired distance between the two zero markers, that is, when the two binary numbers $ga$ and $gw$ are equal, comparator 80 provides a pulse which is connected to the cylinder counter 77 as a count pulse. Cylinder counter 77 steps by one digit; decoder 76 provides a signal at its second Zyl 2 output. This signal is applied to the OR-gate 78 to reset the ignition angle counter 37 to zero.

At the same time, comparator 80 receives a new binary number $ga$ since the address input of the firing interval memory 79 has a new address number applied thereto. The ignition angle counter 37 continues to count until it reaches the new number $ga$. This counting process by the ignition angle counter 37 is indicated in FIG. 11 by the saw-tooth wave at the top line thereof as curve $gw$.

As soon as the number $gw$ again has equality with number $ga$, comparator 80 provides a new counting pulse to the cylinder counter 77. Cylinder counter 77 now will have a binary number at its output representative of the third cylinder, so that decoder 76 will provide an output signal at its third Zyl 3 line. This signal is again applied over the OR-gate 78 to the ignition angle counter 37 to reset the ignition angle counter 37. The firing interval memory 79 provides a binary number $ga3$ which represents the distance of the zero marker of the third and of the fourth cylinders. When the ignition angle counter 37 has reached this number, comparator 80 provides a further count pulse to the cylinder counter 77. Decoder 76 provides a pulse at its fourth Zyl 4 line which resets the angle counter 37 over the OR-gate 78. The fourth counting cycle of the ignition angle counter 37 is not terminated by a new count state of the decoder 76, but rather by the next reference pulse $fr$ as above described. Any possible malfunction of the decoder during an operating cycle is thus restricted to one such cycle and does not propagate further during subsequent operating cycles.

The comparator 38 continues to compare the binary number derived from ignition angle counter 37 with the number stored in buffer 70 during the saw-tooth wave like rise of the curve $gw$ (FIG. 11). The final count state $gi$ of the totalizing counter 68 is indicated in FIG. 11. This count state did not change with respect to each cylinder, but only three times. As soon as the number $gw$ is greater than the number $gi$, binary comparator 38 provides a firing pulse $fz$. The pulses $fz$ are distributed to the various cylinders by an electronic distribution network 74, illustrated in FIG. 10a. The various pulses $fz1$ to $fz4$, associated with the firing pulses of the various cylinders are also illustrated in FIG. 11. The last line of FIG. 11 shows the final count state $gz$ of the cylinder counter 77.

Figure 10A:
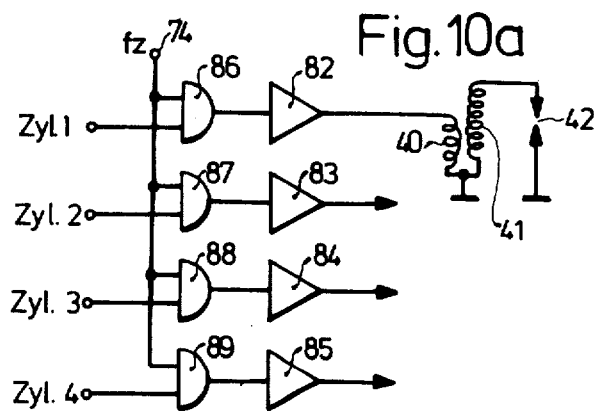
FIG. 10a is a schematic diagram of an electronic distribution circuit.

The electronic distribution network is schematically shown in FIG. 10a. Four power amplifiers 82 to 85 each have an ignition coil 40, 41 connected thereto; only one such coil is shown connected to power amplifier 82, for purposes of clarity of the drawing. Each power amplifier has its input connected to the output of a respective AND-gate 86, 87, 88, 89. One input of the AND-gate 86 to 89 is connected to the firing pulse terminal 74; the other inputs of the respective AND-gates are connected to the outputs Zyl 1' and Zyl 2 to Zyl 4 of the decoder 76.

The trigger pulse $fz$ is applied to all the AND-gates 86 to 89 and is conducted to the respective power amplifier by that one of the AND-gates 86 and 89 which has a logic 1-signal at its second terminal. Thus, when the decoder 76 provides a logic 1-signal at the output line Zyl 3, then the trigger pulse $fz$ is transferred over the AND-gate 88 to power amplifier 84, to cause an ignition pulse to appear at the spark plug of the third cylinder, to fire the mixture in the third cylinder. Similar considerations apply to the other cylinders.

Figure 12:
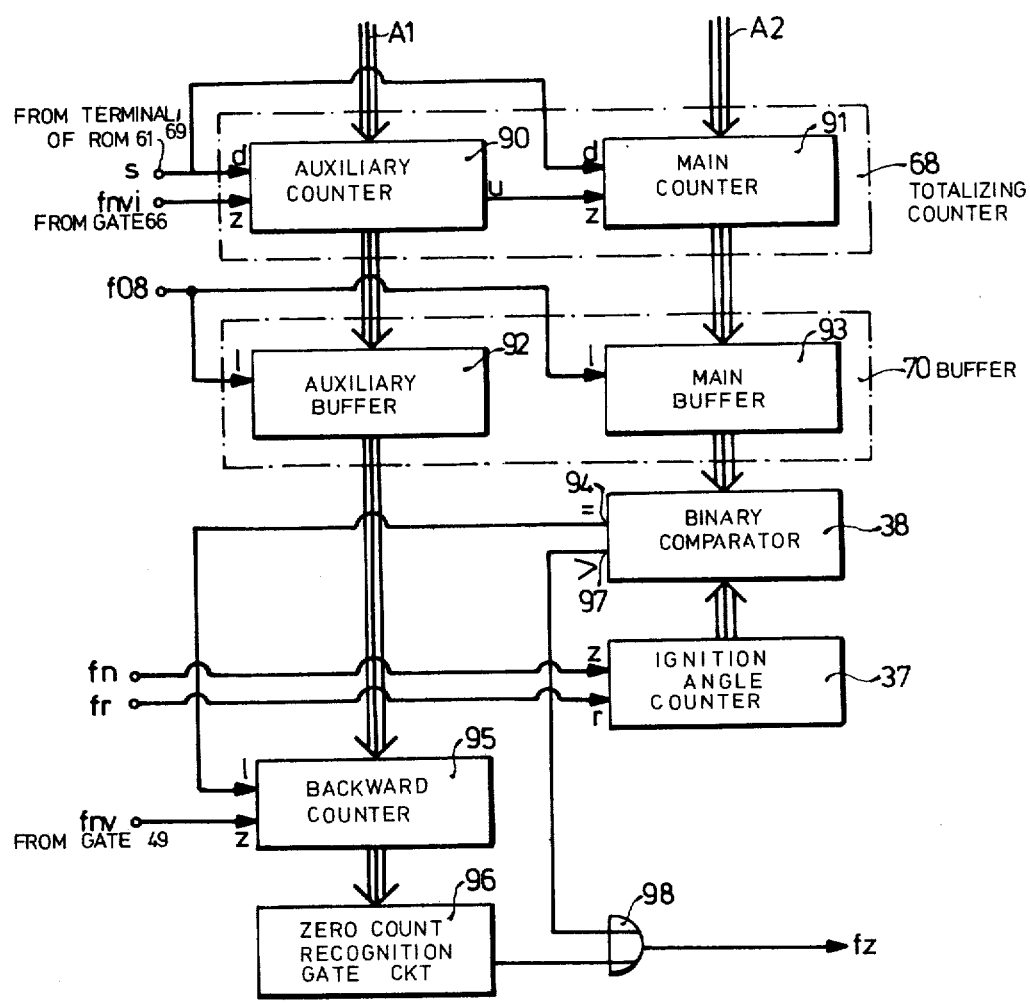
FIG. 12 is a block diagram of a trigger circuit with improved angular resolution.

Under some conditions, a more accurate or a finer resolution of the firing angle of the pulse $fz$ is desired. FIG. 12 illustrates, schematically, a circuit which permits such finer angular resolution. The firing angle can be set to an accuracy of one-half degree. It is difficult to construct star-wheels like the star-wheel 24 (FIG. 1) with more than 120 teeth, while still keeping the star-wheel to a tolerable size. The angular resolution available then is 3°. The resolution can be improved in two ways: (a) the ignition angle counter 37 may have a separate frequency multiplier stage 72 connected to its input. A suitable circuit is described in detail in connection with FIG. 13. (b) The angle counter 37 has the frequency $fn$ directly applied thereto, but the totalizing counter 68 is sub-divided into two stages. The second possibility — division of the totalizing counter into two stages — is illustrated in FIG. 12.

The totalizing counter 68 (FIG. 12) is sub-divided into a main counter 91 and into an auxiliary counter 90. The count direction inputs $d$ of the two counters 90, 91 are connected to the output 69 of the timing function memory 61 (FIGS. 4, 5). The count input $z$ of the auxiliary counter 90 is connected to the output of the divider gate 66, to have the output frequency $fnvi$ of the multiplier 67 applied thereto. The overflow output $u$ of the auxiliary counter 90 is connected to the count input $z$ of the main counter 91.

Upon begin of totalizing, both counters 90, 91 are set to the base or initial value A. This value A is sub-divided into two binary numbers A1 and A2 when the circuit of FIG. 12 is used. The binary number A1, applied to the auxiliary counter 90, has the lower significant digits of the numerical value of number A. The buffer 70 is also sub-divided into two storage or memory stages 92, 93. It includes an auxiliary buffer 92, connected to the output of the auxiliary counter 90 and a main buffer memory 93 connected to the output of the main counter 91. The two loading inputs 1 of the buffers 92, 93 are connected together and to the output from frequency divider 47 which supplies the timing marker frequency $f08$. The outputs of the main buffer 93 and of the ignition angle counter 37, respectively, are compared in binary comparator 38'. The first output 94 of the comparator 38' is connected to the loading input 1 of a backward counter 95. The count input $z$ of the counter 95 is connected to the output of the frequency multiplier stage (FIG. 2), so that it has the multiplied speed angle frequency $fnv$ (FIG. 2) applied thereto. The binary number input of the counter 95 is connected to the output of the auxiliary buffer 92.

The output of the backward counter 95 is connected to the input of a zero count recognition gate circuit 96. A second output 97 of the binary comparator 38', as well as the output of the zero count recognition circuit 96 are connected to an OR-gate 98 which, at its output, provides the ignition or trigger pulse $fz$.

Binary comparator 38', which may utilize the integrated circuit SN 74 85 has two outputs. Output 94 provides a signal when the binary numbers at both inputs are equal. Output 97 provides a signal when the binary number from ignition angle counter 37 is greater than the number stored in the main buffer 93 of the buffer unit 70. The case may arise that the first output 94, that is, the "equality" output never provides a logic 1-signal, so that, since that condition would not arise, no trigger of firing pulse would be delivered. This condition is shown in FIG. 11, top line (graph $gw$) at point 99 (far right of the graph). At the instant of time 99, the storage value $gi$ of the buffer 93 changes in negative direction. Immediately preceding that time, however, it had a value which was greater than that of the ignition angle counter 37. After the change, the number $gi$ is smaller than the number $gw$. If this case arises, the comparator 38' provides an immediate ignition trigger pulse from the second output 97 and OR-gate 98. In all other cases, in which the binary number $gi$ provided by the totalizing counter 68 does not change in the immediate vicinity of the desired ignition instant, fine subdivision of the timing between the two angular pulse source fn is obtained. For example, the auxiliary counter 90 may be a three-stage counter which, then, will sub-divide the frequency fnvi in the ratio of 8 : 1. Similarly, the angular frequency between two teeth of the star-wheel 24 will be divided by eight. If this angular distance, as in the selected example is 3°, dividing by eight would provide an angular resolution of just under 0.4°.

FIG. 11 illustrates four saw-tooth waves $gw$ in which, under normal ordinary counting conditions, the ignition angle counter 37 reaches the same numerical value as the numerical value which is stored in the main buffer 93. If this is the case — see the first four saw-tooth waves of FIG. 11— then the highest number of the totalizing counter 68 has been considered. The comparator 38' then provides at its first output 94 a logic 1-signal which is applied to the count input 1 of the counter 95. Counter 95 receives that binary number which is stored in the first or auxiliary buffer storage stage 92 of the buffer 70. This number, corresponding to the number of stages of the auxiliary counter 90, will have three binary digits. It is equal to the remainder which the comparator 38 has not yet considered and which corresponds to the fine resolution of the angle. Counter 95 is a backward counter and in the subsequent time interval, that is, the interval after equality being indicated at the output 94 of the comparator 38, it counts pulses of the multiplied angular frequency $fnv$ in backward direction until it reaches the count state 0. Let it be assumed that auxiliary buffer 92 has the number 101 therein (decimal 5). Counter 95 then will reach the count state 0 after five count pulses. Zero count recognition gate 96 then will provide a pulse to the OR-gate 98 which becomes the ignition pulse $fz$. It is here assumed that the multiplied angular frequency fnv is eight times that of the direct angular frequency $fn$. If the auxiliary counter 90 has a different number of stages, then the multiplication factor of the multiplied frequency $fnv$ with respect to the direct frequency $fn$ must be changed similarly.

Figure 13:
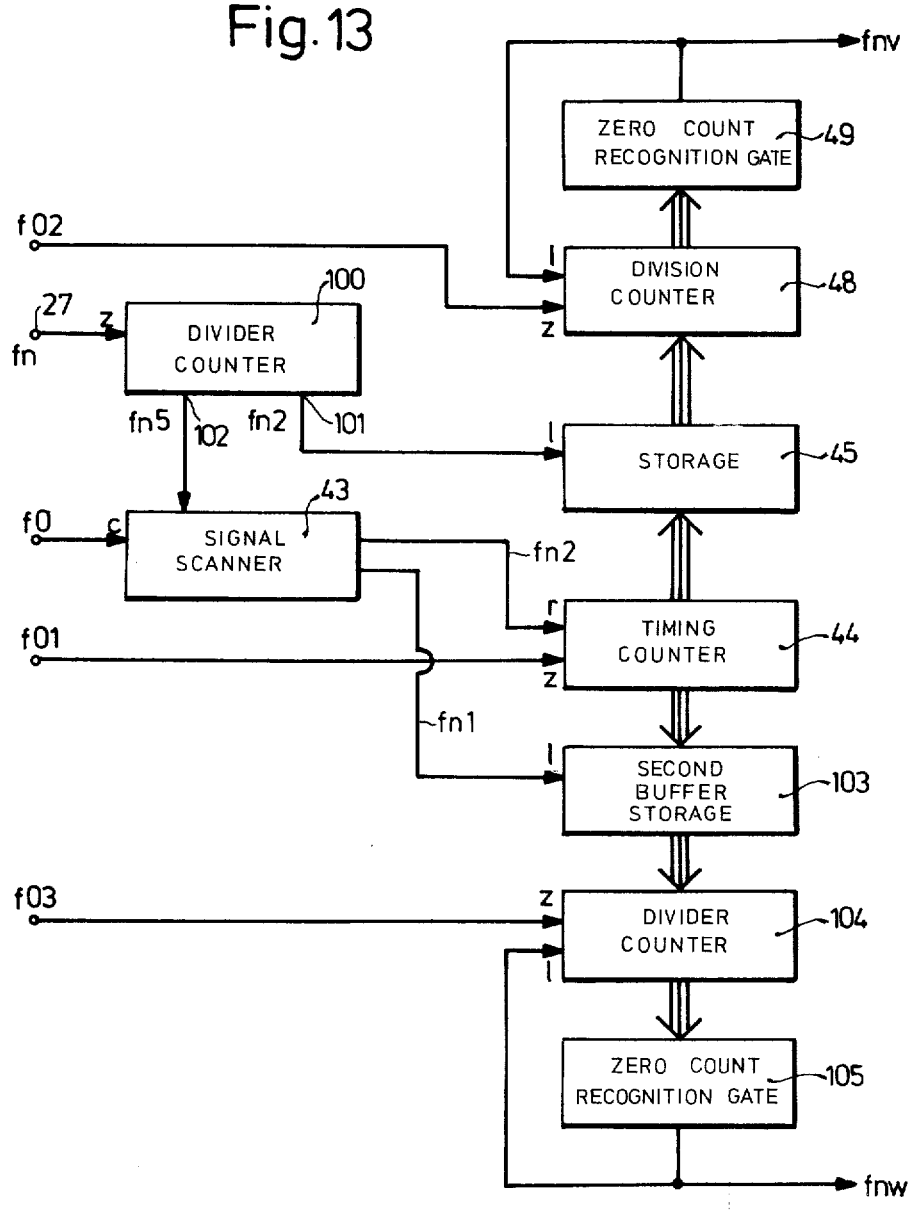
FIG. 13 is a block circuit diagram of a frequency multiplying circuit having two multiplying factors.

FIG. 13 illustrates a circuit which includes the frequency multiplying stage of FIG. 4 and the multiplier 72 of FIG. 10, but which uses only a single timing counter 44. Yet, two different frequencies $fnv$ and $fnw$, of different multiplying factors may be generated. The timing counter 44, the storage unit 45, the division counter 48 and the zero count recognition gate 49 are all identical to the elements in the circuit of FIG. 2. The first output 27 from signal generator 20' (FIG. 1) is connected to a divider counter 100 which has two outputs 101, 102 with different division factors. The division factors selected, in the example of FIG. 13, result in output frequencies $fn/2$ and $fn/5$. Output 101 (output frequency $fn/2$) has half the speed angle signal frequency, and is connected to the loading input 1 of the storage unit 45. The second output 102 of the divider counter 101 (divided frequency $fn/5$) is connected to the input of the signal scanner 43. One output of the signal scanner 43 is connected to the loading input 1 of a second buffer storage unit 103. The second output of the signal scanner 43 is connected to the reset input $r$ of the timing counter 44. A second divider counter 104 is connected to the output of the second buffer storage unit 103. The count input $z$ of the second divider counter 104 has a divided clock frequency $f03$ applied thereto from the frequency divider 47. The output of the second divider counter 104 is connected to a zero recognition gate 105 which, similar to zero count recognition gate 49, recognizes the zero state of the divider counter 104. Gate 105 provides at its output a frequency $fnw$ which is also fed back and applied to the loading input of the second divider counter 104.

The generation of the frequency fnv is exactly comparable to that described in connection with FIG. 2. The counter state of timing counter 44 is transferred, however, to the storage 45 only at each second pulse $fn$ of the speed angle pulse source, since the frequency at the output 101 of the divider counter 100 has a relationship of 2 : 1 with respect to the input frequency $fn$, that is, is half that of the input frequency. The divider counter 48 counts the count state, as previously described.

Timing counter 44 continues to count after transfer of its count state into divider counter 45. After five $fn$ pulses, the second output 102 of the divider counter 100 also provides a pulse. The count state of the timing counter 44 is transferred into the second buffer storage 103 under control of the signal applied to the loading input of the buffer storage derived from the signal scanner 43; shortly thereafter, the timing counter 44 is reset. The binary number in the second buffer 103 is counted out in the second divider counter 104 in the same manner as the divider counter 48 counts the state of the storage unit 45. The multiplication factor of the output frequency $fnw$, only, is smaller since the number in buffer 103 is greater than the number stored in storage unit 45.

The multiplication factor can further be influenced by suitable selection of the clock sub-frequency $f03$. The two multiplied speed angle frequencies $fnv$ and $fnw$ may, therefore, have any desired multiplication factor, so that the counting frequencies of the totalizing counter 68 and of the ignition angle counter 37 can be fitted to any desired multiplication factor Bi (FIGS. 4, 5, 6).

The circuit, as described, thus provides a solution to the problem posed and set forth in the object of the present invention. Any desired function may be simulated, and followed, by storage of suitable binary numbers in the timing function memory 61 (FIGS. 4, 5). The polarity of the slope, that is, positive or negative (upwardly or downwardly), does not matter. Accuracy is ensured and maintained over the life of the equipment, without aging effects. Stray fields, currents, or other phenomena do not affect the system, since it operates exclusively in digital mode.

The accuracy of the firing angle is determined by the precision of the pulse source 20 or, rather, of the pulse sources 20', 20'' respectively and their relative relationship. This pulse source is of simple construction and can be manufactured with high precision. Resolution of the angle crankshaft rotation can be further improved by means of the circuits of FIGS. 12 and 13, and the angle can be electronically resolved to even higher degrees of accuracy than those described, by merely extending the range of the digits of the auxiliary counter 90, and auxiliary buffer 92 (FIG. 12) or changing the division ratio of the divider counter 100. Resolution should not be equated with instantaneous accuracy, however, since new information regarding instantaneous speed (within the angle of rotation of two adjacent teeth of star-wheel 24, FIG. 1) is not provided. New speed information is provided only when the next subsequent tooth of the star-wheel 24 passes the yoke 25. In the example selected, new speed information is provided each 3° of revolution of the crankshaft. This is usuallly sufficient for internal combustion engines, and for most engines which include mechanical rotating equipment. If accurate speed information is desired with a higher degree of angular resolution, different signal sources than the mechanical-magnetic ones illustrated may be used. For example, an optical signal source may be used in which the path of a beam of light to a photo cell is periodically opened and blocked. Optical signal sources can provide up to a thousand pulses per revolution of a signal disk while requiring only a comparatively small transducer unit.

Sub-dividing the totalizing counter 68 into a main counter 91 and an auxiliary counter 90 has the advantage that drift errors due to inaccuracies of the frequency multiplication (fnv) does not affect the ignition angle counter 37 as much. Drift errors arise particularly if the buffers, or storage units 45, 103 (FIG. 13) store only very low binary numbers (at high engine operating speed) so that the resolution of the cycles, with respect to time, of the individual pulse cycles is subject to higher truncating errors.

The requirements with respect to the precision of the reference pulse source 20'', that is, contact 21 and cam 22, can be reduced if the reference pulse $fr$ is synchronized in a circuit in accordance with FIG. 3a with the next subsequent pulse $fn$ of the speed signal transducer system 20'. The reference pulses then will have the same accuracy as those of the speed angle pulses $fn$.

Various changes and modifications may be made, and features described in connection with any one of the embodiments or elements, units or portions of the entire system described may be used with any other component, or portion, within the scope of the invention concept.

The code numbers of the identified integrated circuits relate to parts made by Texas instruments.

We claim:

1. Digital timing system to control the timing of a controlled event with respect to elements which move in an apparatus, upon operation thereof, to provide a timing trigger output signal, particularly to control the ignition timing of an internal combustion engine with respect to speed, or other operating parameters of the engine, said system having
    a pulse train source (20') coupled to an element of said apparatus and providing a sensed pulse train ($fn$) representative of change of said element during operation of the apparatus;
    a reference pulse source (20'') providing a reference pulse ($fr$) at a predetermined reference position of a reference element;
    wherein the improvement comprises
    a function storage and transform stage (34) storing the transfer characteristic between change in position of the apparatus element and the resulting change in timing of the trigger signal with respect to the reference position, connected to and having said pulse train ($fn$) applied thereto and generating a modified pulse train (fnvi) at a frequency which determined by the stored transfer characteristic relating the relative changes of position and change in timing;
    a reversible counter (36; 68–70) having said modified pulse train applied thereto;
    a change-of-position counter (37) having a count input terminal ($z$) connected to the pulse train source (20) and a reset terminal ($r$) connected to the reference pulse source (20'') to reset the counter and then commence a counting cycle at said sensed pulse train rate;
    and a binary comparator connected to both the reversible counter (36; 68, 70) and to the change of position counter (37) and generating a trigger signal when the count states of said counters have reached a predetermined relative relationship.

2. System according to claim 1, further comprising at least one additional pulse train source (28) coupled to at least one additional respective element in said apparatus and providing at least one additional respective sensed pulse train ($fp$) representative of change of the respective additional element during operation of the apparatus.

3. System according to claim 1, further comprising a source of binary signals (35) representing a binary number, said number being related to an operating parameter of the apparatus;
    and wherein the function storage and transform stage (34) stores the transfer characteristic between change in said operating parameter of the apparatus and resulting changes in timing of the trigger signal with respect to said change in the operating parameter, said function storage and transform stage (34) generating said modified pulse train at a frequency which is determined by the stored transfer characteristic relating the relative changes of said parameter to said change in timing.

4. System according to claim 1, wherein the transfer characteristic comprises a curve approximated by a sequence ($\Delta fi$) of straight lines of respective slopes, said slopes being represented as binary numbers in which the output frequency ($fnvi$) of the function storage and transform stage (34) changes linearly with respect to the input frequency ($fn, fp$), and said function storage and transform stage (34) comprises
    a plurality of storage positions storing said binary numbers in predetermined addresses;
    means (56, 58, 59, 60, 61) generating a sequence of separately modified pulse trains representative of the respective input frequency ($fn, fp$) at the respective function transform slopes;
    and wherein the reversible counter (36, 68, 70) comprises a totalizing counter connected to totalize the frequency cycles of said separately modified pulse trains.

5. System according to claim 4, wherein the function storage and transfer stage includes a frequency counter (FIG. 4: 56; FIG. 5: 57') connected to convert the number of separate frequency cycles ($\Delta fi$) at any given slope into time intervals ($\Delta ti$).

6. System according to claim 5, further comprising a clock source (46) providing a timing signal and controlling timing of the counting of said totalizing counter (68).

7. System according to claim 5, wherein the means generating said sequence of separately modified pulse trains comprises a timing function memory (61) having an address input (62) and having a first output (63) providing numbers representative of the numbers of separate frequency cycles ($\Delta fi$) and being applied to said frequency counter (56);
   an address counter (60) connected to said frequency counter (56) and providing an output each time when said frequency counter has reached a representative predetermined number, said address counter being connected to the address input and stepping the function memory to provide a different number representative of a different slope when the frequency counter (56) has reached a respective predetermined number.

8. System according to claim 7, wherein the frequency counter (56) is a backward counter and said predetermined number is zero;
   and wherein means (58) are provided connected to the frequency counter (56) and recognized in the count state of zero therein and stepping the address counter (60).

9. System according to claim 7, further comprising transfer switch means (55) having a first input ($fnvo$) to which a signal representative of one operating parameter (speed) of the apparatus is applied; and having another input ($fnpo$) to which a signal representative of another operating parameter (induction pipe vacuum) of the apparatus is applied, the output of said transfer switch being selectively connected to the timing function memory (61);
   and a clock source (46, 47) providing a timing output signal ($f06$) to said transfer switch to transfer the output of the switch from one input to the other at a predetermined time instant.

10. System according to claim 9, wherein the clock source (46, 47) provides a first fixed marker pulse ($f06$) to determine a first totalizing time (T1) during which the signal ($fn$) representative of the first operating parameter (e.g. speed) of the apparatus is being processed and transformed,
   and a further fixed marker pulse ($f08$) to determine a further totalizing time (T2) during which the signal ($fp$) representative of another operating parameter (e.g. induction pipe vacuum) of the apparatus is being processed and transformed;
   and wherein the first fixed marker pulse ($f06$) which determines when the signal is being processed and transformed is also applied to and connected to the address input of the timing function memory (61) to cause said memory to provide outputs respectively associated with the further function to transform the further respective signals.

11. System according to claim 7, further comprising a multiplier (67) having a signal applied thereto representative of an operating parameter ($fn, fp$) of the apparatus, the other input of the multiplier being connected to an output of the timing function memory (61).

12. System according to claim 11, wherein the multiplier is a serial multiplier having a divider counter (57) and a divider gate (66);
   the count input ($z$) of the divider counter having said signal ($fn, fp$) applied thereto and the divider gate (66) having a binary number applied thereto representative of the timing interval (Bi);
   the output of the divider gate (66) being connected to the count input ($z$) of the totalizing counter (68).

13. System according to claim 12, further comprising a clock source (46, 47), the load input (1) of the totalizing counter (68) being controlled by a timing marker signal ($f08$) from the clock source;
   said totalizing counter (68) being connected to a third output (65) of the timing function memory (61) and receiving an initial value (A) upon having said timing marker signal ($f08$) applied thereto before totalizing the output from the multiplier (67).

14. System according to claim 13, wherein the totalizing counter (68) has a count direction input ($d$) connected to a further output (64) of the timing function memory (61), said output controlling the direction of counting of the totalizing counter.

15. System according to claim 12, wherein (FIG. 5) the divider counter (57') is connected to an output (63) of the timing function memory (61) to function simultaneously as a frequency counter to convert the number of separate frequency cycles ($\Delta fi$) at any given slope into time intervals ($\Delta ti$), the binary number output of the divider counter (57') being connected to the address counter (60) to change the address when a predetermined count number has been counted.

16. System according to claim 7, wherein the timing function memory (61) has a plurality of address locations in groups;
   one group of said address locations being associated with and controlling retrieval of the transform function of input signals with respect to one operating parameter (e.g. speed) of the apparatus;
   another group of the address locations being associated with and controlling retrieval of the transform function of input signals with respect to another operating parameter (e.g. induction pipe vacuum) of the apparatus;
   and a further address location being addressable by signals in the form of binary numbers, said numbers being representative of further operating parameters (e.g. temperature; exhaust gas composition) of the apparatus.

17. System according to claim 16, wherein the system comprises a clock source (46, 47) providing timing marker pulses;
   at least one of said timing marker pulses ($f06$) is connected to the address input (62) of the timing function memory (61) to provide for proper addressing of the locations of the memory;
   and said numbers representative of further operating parameters being applied to further address inputs (35, 35') of the memory (61).

18. System according to claim 7, wherein the system comprises a clock source (46, 47) providing timing marker pulses connected to control signal transfer in the system;
   a buffer memory (70) is provided connected to the totalizing counter (68), the number in said totalizing counter (68) being transferred to the buffer memory (70) under control of a timing marker pulse ($f08$) after elapse of the last predetermined totalizing interval (T2) and the totalizing counter is reset to a predetermined initial number (A);

the buffer (70) being connected to the binary comparator (38) and the number stored in the buffer (70) being applied to the binary comparator to effect comparison with the number in change-of-position counter (37).

19. System according to claim 17, wherein the change-of-position counter (37) has a pulse train applied thereto having a frequency representative of speed of movement of the apparatus.

20. System according to claim 1, wherein a frequency multiplier (FIG. 2) is provided connected to receive a signal having a frequency representative of an operating parameter of the engine and changing its frequency upon change of said parameter, said frequency multiplier comprising a series circuit having a timing counter (44), a buffer storage (45), a divider counter (48) and a zero recognition gate (49);

and a clock source (46, 47) providing clock pulses at a rate high with respect to said signals to the timing counter (44), loading and transfer of binary numbers in the timing counter (44) to the buffer (45) being controlled by clock signals from said clock source;

said frequency multiplier providing a multiplied output frequency for connection to said function storage and transform stage (34) and said change-of-position counter (37).

21. System according to claim 1, wherein said operating parameters have different effects at different sequential events under similar changes and operating parameters;

said system further comprising (FIG. 10) an identification unit (81) comprising a differential interval memory (79) storing binary numbers (ga) representative of the difference in effect with respect to different sequential events and to compensate for said differences, the number (ga) stored in said differential interval memory (79) being a measure for the timing of said sequential events with respect to the reference pulse (fr).

22. System according to claim 21, wherein the identification unit (81) comprises a binary comparator (80) and wherein the change-of-position counter (37) and the interval memory (79) have their respective outputs connected to the input of said binary comparator (80);

a counter (77) counting the numbers of sequential events, the output of the binary comparator (80) being connected to the counting input (z) of the counter (77), the binary number output of said event counter (77) being connected to the address input of the interval memory (79).

23. System according to claim 22, further comprising a multi-output decoder (76) connected to the output of the event counter (77) and decoding the binary number thereof to provide a steering output;

a multi-output distributor circuit (73) having the output (fz) from the binary comparator (38) connected to a main input (74) thereof and the steering outputs from the decoder (76) connected to the control inputs (75), the decoder controlling which one of the outputs (fz1 to fz4) will have the firing signal (fz) connected thereto.

24. System according to claim 23, further comprising an OR-gate (78) connected to the reset input of the change-of-position counter (37), the input of the OR-gate being connected to the output of the decoder (76) and to the reference pulse source (20'').

25. System according to claim 1, wherein (FIG. 12), to improve resolution of the firing event with respect to change of position of the element, the totalizing counter (68) is divided into a main counter (91) and an auxiliary counter (90), the count input (z) of the main counter being connected to the overflow output (u) of the auxiliary counter (90);

a buffer (70; 92, 93) is connected to the totalizing counter (68), the buffer being connected to the binary comparator (38').

26. System according to claim 25, wherein the buffer (70) comprises a main buffer (93) connected to the main counter and an auxiliary buffer (92) connected to the auxiliary counter (91);

a control counter (95) is provided connected to the auxiliary buffer (92), a connection from the binary comparator (38) to the resolution counter (95) to effect transfer of the number in the auxiliary buffer (92) upon equality of the numbers applied to the comparator (38);

said resolution counter (95) having a count frequency applied thereto which is a multiple of the frequency ($fnv$) of the pulse train ($fn$) representative of change of the element during operation of the apparatus, and means (96) recognizing a predetermined count state of the resolution counter (95) and providing a trigger signal ($fz$) upon recognition of said predetermined count state.

27. System according to claim 26, wherein the resolution counter (95) is a backward counter and the recognition means comprises a zero recognition circuit (96), said predetermined number being zero.

28. System according to claim 26, wherein the binary comparator (38') has a first output (94) which provides a signal when equality exists at its inputs, and a second output when the input from the change-of-position counter (37) is greater than the input from the totalizing counter (68) through the buffer, the first output being connected to the load control input (1) of the resolution counter (95) and the other output providing an alternate output terminal to provide said trigger signal ($fz$).

29. System according to claim 1, comprising (FIG. 13) a frequency multiplying stage connected to the pulse train source (20'; $fn$) and providing two outputs of multiplied frequencies ($fnv$, $fnw$) for connection to the storage and transform stage (34) and to the change-of-position counter (37), respectively, said frequency multiplying stage comprising a single timing counter (44) having a clock frequency ($f01$) applied thereto and being controlled to count said clock frequency under control of the pulse train ($fn$) from said pulse train source (20'), said timing counter having two outputs;

first and second buffers (45, 103) connected to the respective outputs of the timing counter (44) and respectively controlled to load the counts from the timing counter at different loading rates;

divider counters (48, 104) each connected to the respective buffer and controlled to count at respectively different counting rates;

and count recognition gates (49, 105) connected respectively to said divider counters (48, 104) and providing a signal when the respective divider counter has reached a predetermined count state.

30. System according to claim 29, wherein the pulse source (20') providing said pulse train ($fn$) is connected to a divider counter (100) having two outputs providing output frequencies at two different dividing frequencies (101: $fn/2$; 102: $fn/5$);
one output (101) being connected to the load (1) input of the first buffer (45) and the other output (102) being connected to the second buffer (103) and means (43; $fn2$) connected to reset the timing counter.

31. System according to claim 1, wherein the apparatus is an internal combustion engine;
the pulse train source is connected to provide pulses in synchronism with the rotation of the output shaft of the engine;
the reference pulse source provides a reference pulse at a predetermined angular position of the shaft of the engine;
the trigger signal is the ignition firing signal ($fz$), the change of position counter (37) counts the ignition angle;
and the function storage and transform stage (34) stores, in binary number representation, change of ignition angle as a function of engine operating parameters including speed ($fn$) and at least one of: engine loading ($fp$); engine temperature; exhaust gas composition.

32. System according to claim 1, wherein the function storage and transform stage (34) stores, in discrete addresses, binary numbers representing change in position of the apparatus element at predetermined operating conditions and with respect to predetermined operating parameters, and including means (56, 57'; 58, 59, 60) generating a sequence of addresses to retrieve said binary numbers, the reversible counter being controlled by the numbers stored in said stage (34) and counting to numbers determined by said binary numbers.

33. Ignition control system for internal combustion engines having
a speed pulse train source (20') coupled to an engine and providing an engine speed pulse train having a frequency ($fn$) representative of engine speed;
a reference pulse train source (20") coupled to the engine and providing a reference pulse ($fr$) at a predetermined angular position of the engine shaft;
wherein the improvement comprises
an ignition angle counter (37) triggered by the reference pulse ($fr$) and counting pulses derived from said speed pulse train ($fn$) at a rate representative of the frequency thereof, and providing a binary number representative of said counted pulses which occur after said reference pulse;
a function storage and transform stage (34) providing a binary number representative of optimum time of occurrence of the ignition pulse ($fz$) after said reference pulse ($fr$) under then existing engine operating conditions;
said function storage and transform stage (34) storing, in discrete addresses, binary numbers representing the firing angles, at predetermined speeds, and including means (56, 57'; 58, 59, 60) generating a sequence of addresses to retrieve said binary numbers;
a totalizing counter (36, 68, 70) controlled by the numbers stored in said function storage and transform stage and counting the numbers of pulses of the pulse train applied thereto for predetermined periods of time (0-T1-T2), at a rate ($fnvi$) determined by said binary numbers;
and a binary comparator (38) connected to the binary number output of the totalizing counter (36, 68, 70) and the ignition angle counter (37) and upon detection of a predetermined relationship between said numbers generating an ignition pulse.

* * * * *